United States Patent
Kato et al.

(10) Patent No.: US 10,452,338 B2
(45) Date of Patent: Oct. 22, 2019

(54) SHARED TERMINAL AND IMAGE TRANSMISSION METHOD

(71) Applicant: Ricoh Company, Ltd., Tokyo (JP)

(72) Inventors: Yoshinaga Kato, Kanagawa (JP); Takeru Inoue, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 122 days.

(21) Appl. No.: 15/672,421

(22) Filed: Aug. 9, 2017

(65) Prior Publication Data

US 2018/0046426 A1 Feb. 15, 2018

(30) Foreign Application Priority Data

Aug. 10, 2016 (JP) .................. 2016-157374
Jul. 11, 2017 (JP) .................. 2017-135364
Jul. 27, 2017 (JP) .................. 2017-145404

(51) Int. Cl.
*G06F 15/16* (2006.01)
*G06F 3/14* (2006.01)
(Continued)

(52) U.S. Cl.
CPC .......... *G06F 3/1454* (2013.01); *G06F 3/1423* (2013.01); *G06Q 10/10* (2013.01); *G06Q 10/107* (2013.01); *G06Q 50/20* (2013.01)

(58) Field of Classification Search
CPC .................. G06F 3/1454; G06F 3/1423
(Continued)

(56) References Cited

U.S. PATENT DOCUMENTS 6,105,055 A 8/2000 Pizano et al.
6,724,373 B1 * 4/2004 O'Neill, Jr. ......... G06F 3/03545
345/156
(Continued)

FOREIGN PATENT DOCUMENTS

EP   1 107 570 A2   6/2001
JP   2001-292266   10/2001
JP   2017-112581   6/2017

OTHER PUBLICATIONS

Extended European Search Report dated Oct. 9, 2017 in Patent Application No. 17185175.1.

*Primary Examiner* — Umar Cheema
*Assistant Examiner* — Hannah S Wang
(74) *Attorney, Agent, or Firm* — Xsensus LLP

(57) ABSTRACT

A shared terminal, includes circuitry to control a display to display an image to a plurality of users, the plurality of users sharing a use of the shared terminal; and a network interface to communicate with a terminal management server and a destination management server through a network. The circuitry obtains, from a first privately-owned terminal owned by a first user, first terminal identification information for identifying the first privately-owned terminal. Under control of the circuitry, the network interface transmits the first terminal identification information to a terminal management server; receives first user identification information from a terminal management server; transmits the first user identification information to the destination management server; receives a first email address of the first user from the destination management server; and transmits an email whose sender email address is the first email address.

6 Claims, 23 Drawing Sheets

(51) Int. Cl.
  *G06Q 10/10* (2012.01)
  *G06Q 50/20* (2012.01)
(58) Field of Classification Search
  USPC .......................................................... 709/205
  See application file for complete search history.

(56) References Cited

U.S. PATENT DOCUMENTS

| | | |
|---|---|---|
| 6,871,318 B1 | 3/2005 | Wynblatt et al. |
| 6,980,331 B1 | 12/2005 | Mooney et al. |
| 2005/0280636 A1* | 12/2005 | Hildebrandt .......... G06F 1/1605 345/173 |
| 2008/0192017 A1* | 8/2008 | Hildebrandt .......... G06F 3/0418 345/173 |
| 2009/0146965 A1* | 6/2009 | Hildebrandt .......... G06Q 10/10 345/173 |
| 2009/0244278 A1* | 10/2009 | Taneja .................. G06Q 10/10 348/143 |
| 2011/0063215 A1* | 3/2011 | Mishima ............... G06F 3/0482 345/158 |
| 2013/0081146 A1* | 3/2013 | Hakozaki ........... H04N 1/00222 726/28 |
| 2014/0149592 A1* | 5/2014 | Krishna ................. G06F 1/329 709/226 |
| 2015/0077369 A1* | 3/2015 | Nagahara ............. G06F 3/0488 345/173 |
| 2016/0234470 A1* | 8/2016 | Honda .................. G06F 3/0425 |
| 2017/0177190 A1 | 6/2017 | Inoue et al. |
| 2017/0364247 A1* | 12/2017 | Cook .................... G06F 3/0482 |

\* cited by examiner

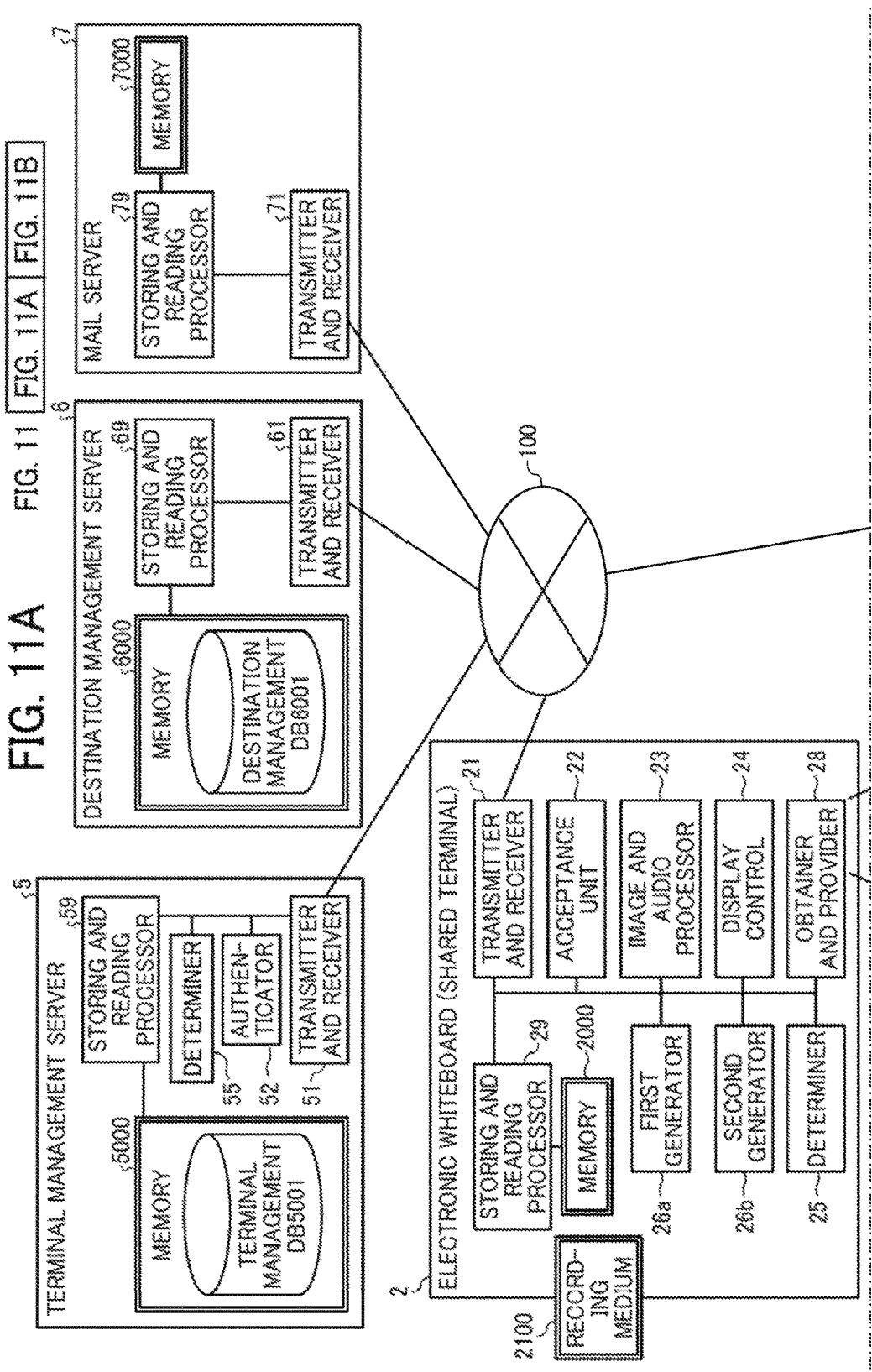

FIG. 12A

| TERMINAL ID | USER ID | USER |
|---|---|---|
| aaa | 10001 | Kato |
| bbb | 10002 | Jim |
| ... | ... | ... |

FIG. 12B

| USER ID | EMAIL ADDRESS |
|---|---|
| 10001 | aaa@xxx.co.jp |
| 10002 | bbb@xxx.co.jp |
| ... | ... |

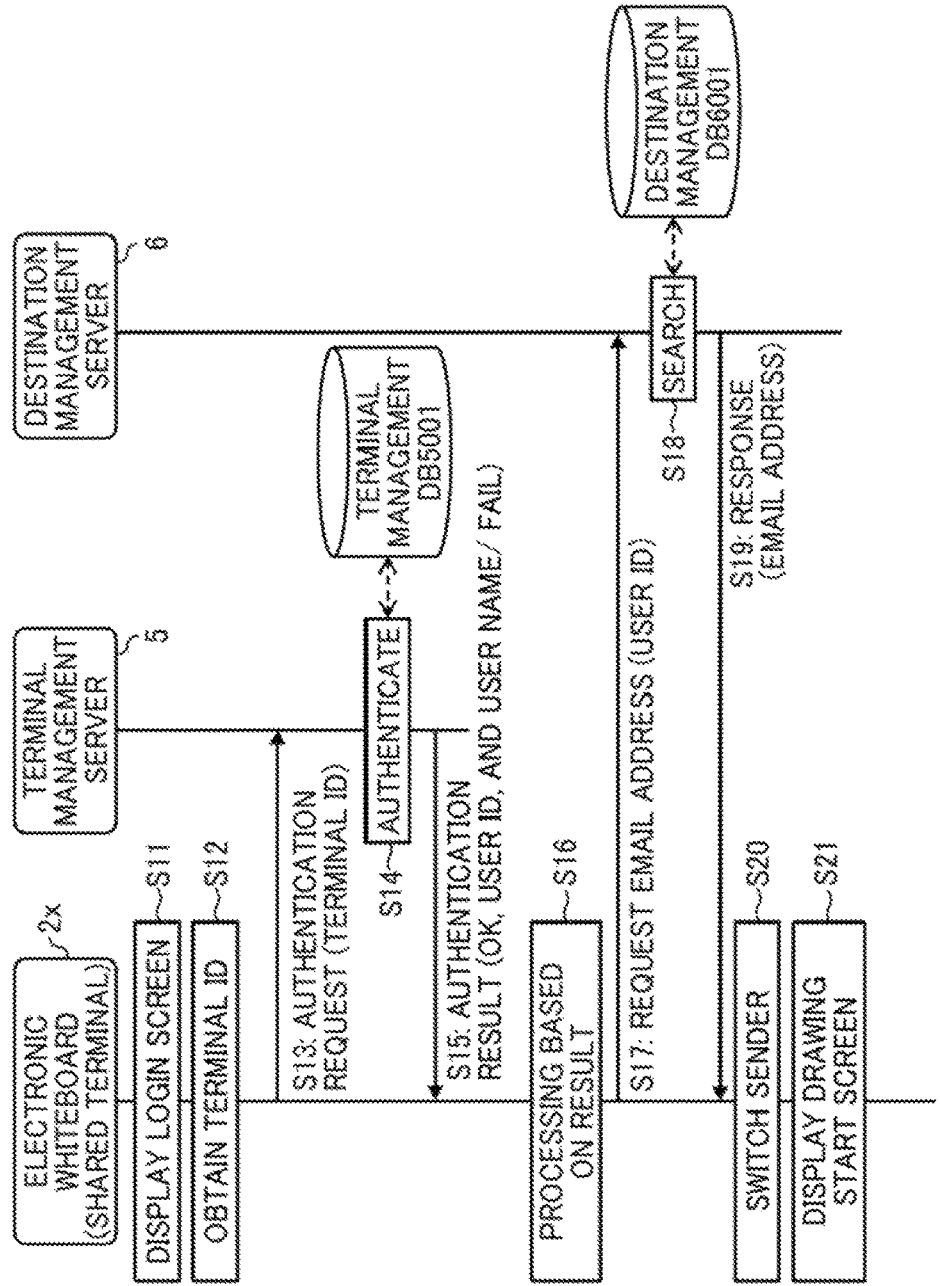

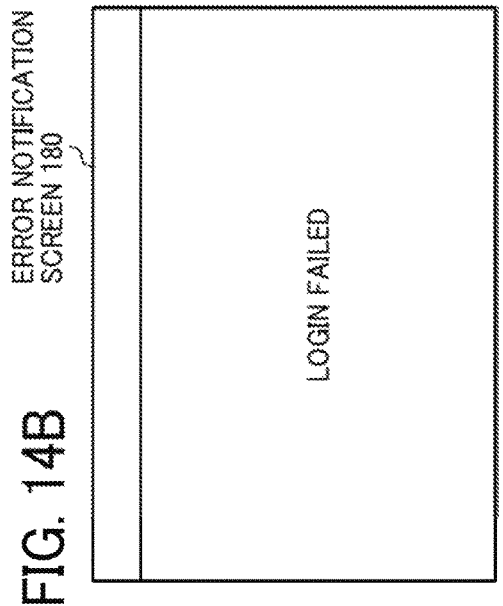
FIG. 14A  LOGIN SCREEN 170
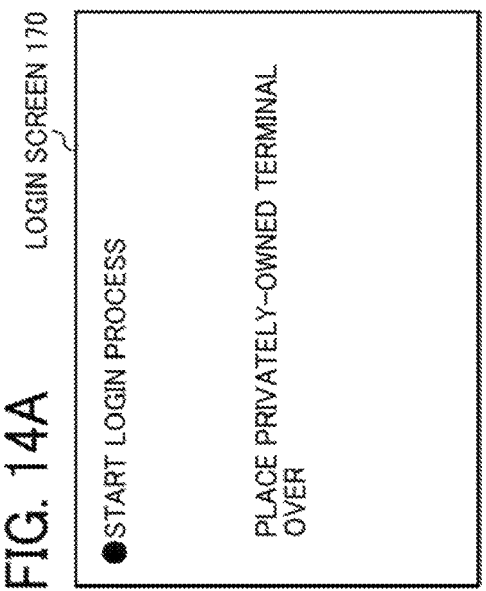
FIG. 14B  ERROR NOTIFICATION SCREEN 180
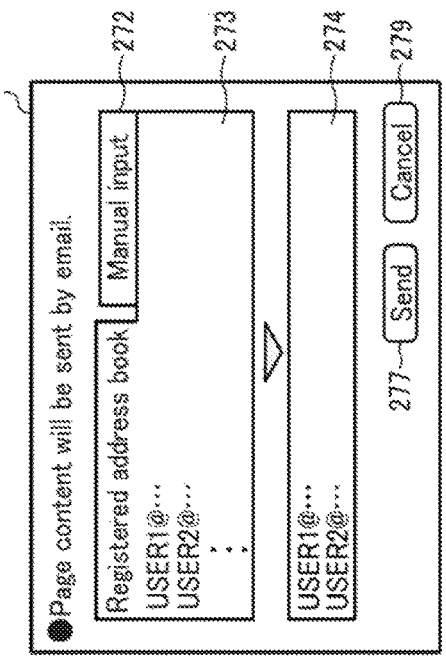
FIG. 14C  DRAWING START SCREEN 180
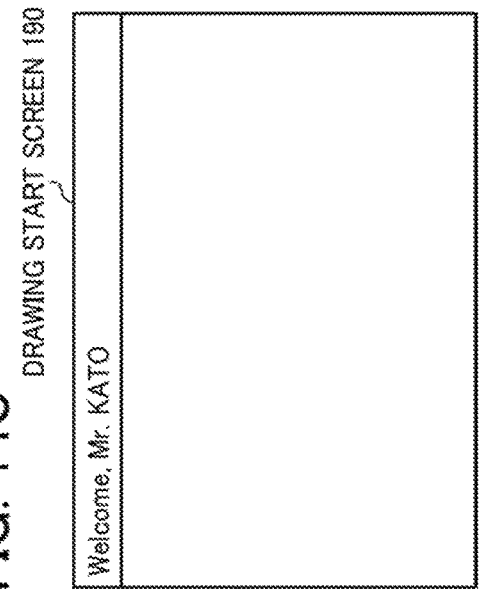
FIG. 14D

SHARED TERMINAL AND IMAGE TRANSMISSION METHOD

CROSS-REFERENCE TO RELATED APPLICATIONS

This patent application is based on and claims priority pursuant to 35 U.S.C. § 119(a) to Japanese Patent Application Nos. 2016-157374, filed on Aug. 10, 2016, 2017-135364, filed on Jul. 11, 2017, and 2017-145404, filed on Jul. 27, 2017 in the Japan Patent Office, the entire disclosures of which are hereby incorporated by reference herein.

BACKGROUND

Technical Field

The present disclosure relates to a shared terminal, and an image transmission method.

Description of the Related Art

Recently, electronic whiteboards are disposed in various types of places such as meeting rooms in companies or classrooms in educational institutions. The electronic whiteboard is provided with a touch panel display of large size, on which each user draws an image with an electronic pen or his or her finger. The image drawn by each user is displayed to a plurality of users in the same room. Through sharing the image between the users, a meeting or a lecture can be conducted more smoothly.

After the meeting or class finishes, the image being displayed on the electronic whiteboard, such as data of the drawing image drawn on the electronic whiteboard, may be transmitted to a personal computer (PC) owned by any user who is participating in the meeting or class, as an attachment file to an email. This simplifies a process of distributing the material used during the meeting or class.

When an email attached with data such as the drawing image data is transmitted from the electronic whiteboard, a sender email address of the email is set to an email address of the electronic whiteboard. In this case, a user who receives the email may have a difficulty recognizing in which meeting the received drawing image data was generated, or with whom such meeting was held.

SUMMARY

A shared terminal includes circuitry to control a display to display an image to a plurality of users, the plurality of users sharing a use of the shared terminal; and a network interface to communicate with a terminal management server and a destination management server through a network. The terminal management server storing in a first memory, for each one of the plurality of users, user identification information for identifying the user in association with terminal identification information for identifying a privately-owned terminal that is privately owned by the user. The destination management server storing in a second memory, for each one of the plurality of users, the user identification information of the user in association with an email address of the user. The circuitry obtains, from a first privately-owned terminal owned by a first user of the plurality of users, first terminal identification information for identifying the first privately-owned terminal. Under control of the circuitry, the network interface: transmits the first terminal identification information of the first privately-owned terminal to the terminal management server; receives first user identification information for identifying the first user from the terminal management server, the first user identification information being obtained by the terminal management server from the first memory using the first terminal identification information received from the shared terminal; transmits the first user identification information that is received to the destination management server; receives a first email address of the first user from the destination management server, the first email address being obtained by the destination management server from the second memory using the first user identification information received from the shared terminal; and transmits, to a given destination, an email whose sender email address is the first email address that is received from the destination management server, to allow a user receiving the email to obtain data relating to the image being displayed to the plurality of users through the shared terminal.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIGS. 11A and 11B are a schematic block diagram illustrating a functional configuration of the communication system, according to an embodiment;

FIG. 12A is a conceptual diagram illustrating a terminal management table, according to an embodiment;

FIG. 12B is a conceptual diagram illustrating a destination management table, according to an embodiment;

FIG. 13 is a sequence diagram illustrating a login process according to an embodiment;

FIGS. 14A, 14B, 14C and 14D are each an example screen displayed by the display at the electronic whiteboard;

Figure 1:
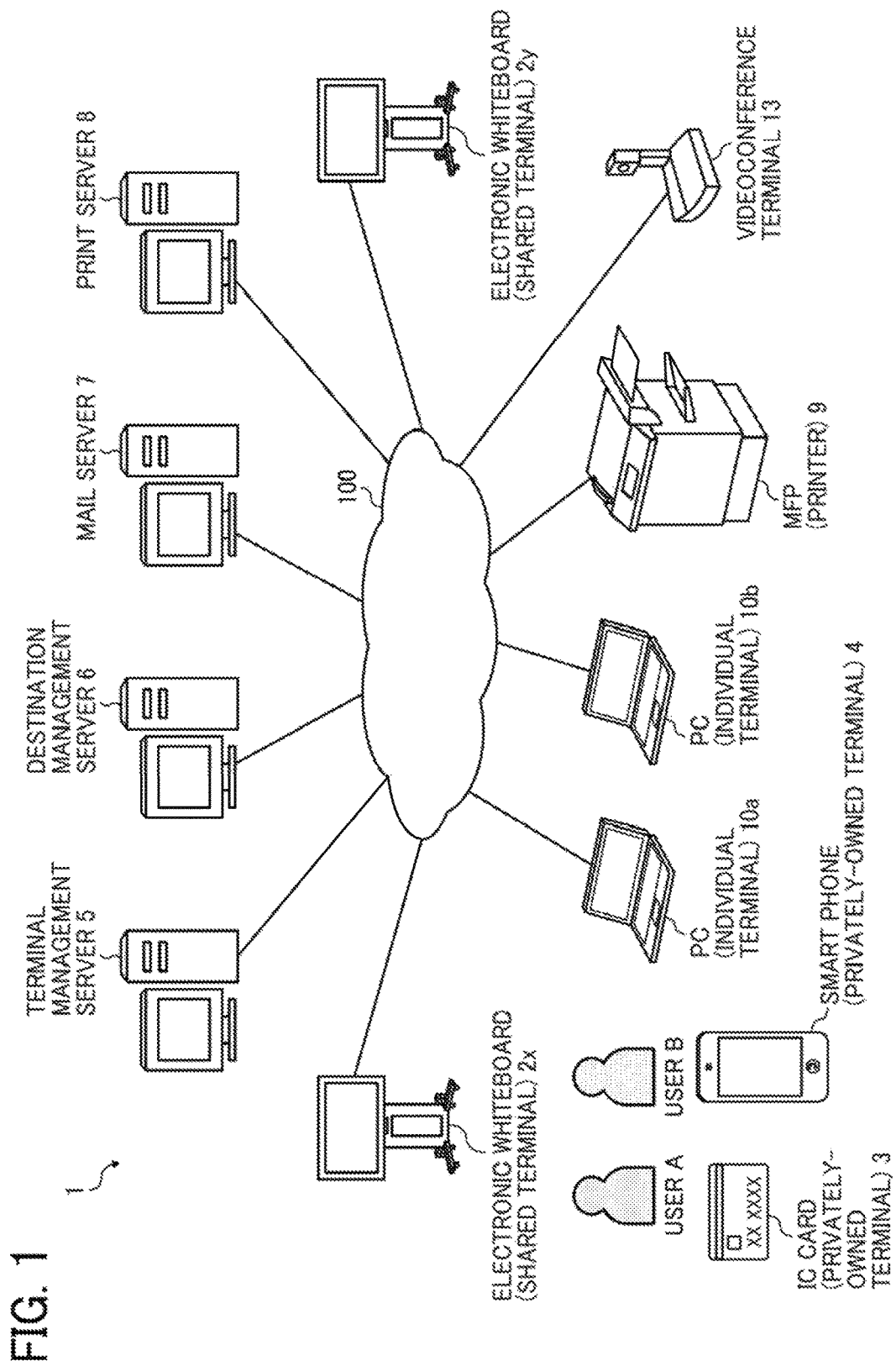
FIG. 1 is a schematic diagram illustrating a communication system according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Referring to the drawings, a communication system 1 is described in detail according to embodiments.

<Overview of System Configuration>

First, an overview of a configuration of the communication system 1 is described according to an embodiment. FIG. 1 is a schematic diagram illustrating a configuration of the communication system 1 according to the embodiment.

As illustrated in FIG. 1, the communication system 1 of the embodiment includes an electronic whiteboard 2x, an electronic whiteboard 2y, an integrated circuit (IC) card 3, a smartphone 4, a terminal management server 5, a destination management server 6, a mail server 7, a print server 8, a multifunction peripheral, product or printer (MFP) 9, personal computers (PCs) 10a and 10b, and a videoconference terminal 13. For simplicity, in the following, any arbitrary one of the electronic whiteboards 2x and 2y is referred to as the "electronic whiteboard 2". Any arbitrary one of the PCs 10a and 10b is referred to as the "PC 10".

The electronic whiteboard 2, the terminal management server 5, the destination management server 6, the mail server 7, the print server 8, the MFP 9, the PC 10, and the videoconference terminal 13 are communicable with one another through a communication network 100. The communication network 100 is implemented by the Internet, mobile communication network, local area network (LAN), etc. The communication network 100 may include, in addition to a wired network, a wireless network in compliance with such as 3rd Generation (3G), Worldwide Interoperability for Microwave Access (WiMAX), Long Term Evolution (LTE), etc. The electronic whiteboard 2, IC card 3, and smartphone 4 are communicable with one another using a near-distance communication technology in compliance with such as Near Field Communication (NFC) (Registered Trademark). The smartphone 4 may communicate with the electronic whiteboard 2 using the near-distance communication technology in compliance with such as Bluetooth (Registered Trademark).

One of the electronic whiteboard 2x and the electronic whiteboard 2y transmits or receives drawing image data representing a content drawn by a user ("drawing image data"), to or from the other one of the electronic whiteboard 2x and the electronic whiteboard 2y. That is, the content drawn at the electronic whiteboard 2x is displayed at the electronic whiteboard 2y, and the content drawn at the electronic whiteboard 2y is displayed at the electronic whiteboard 2x.

The electronic whiteboard 2 generates image data in Refined Printing Command Stream (RPCS) based on the drawing image data, and transmits the generated image data to the MFP 9 through the communication network 100. The MFP 9 prints a drawing image based on the image data received from the electronic whiteboard 2. In another example, the electronic whiteboard 2 generates image data in Portable Document Format (PDF) based on the drawing image data, and transmits an electronic mail attached with the generated image data to the PC 10 through the communication network 100. The PC 10 displays a drawing image based on the image data extracted from the electronic mail.

The electronic whiteboard 2 may display an image other than the drawing image drawn by the user ("non-drawing image"), such as an image of a presentation material or an image of a background displayed on a display 220 provided with the electronic whiteboard 2. The electronic whiteboard 2 generates image data in RPCS based on non-drawing image data, and transmits the generated image data to the MFP 9 through the communication network 100. In another example, the electronic whiteboard 2 generates image data in PDF based on the non-drawing image data, and transmits an electronic mail attached with the generated image data to the PC 10 through the communication network 100.

In this disclosure, the image data in PRCS and the image data in PDF each represent a content of a drawing image drawn by a user, or a non-drawing image displayed by a user, for example. The electronic whiteboard 2 is an example of a shared terminal to be shared by a plurality of users. The plurality of users are able to view a same image simultaneously. The IC card 3 and the smartphone 4 are an example of a privately-owned terminal, privately owned by each user. Preferably, the privately-owned terminal is a portable terminal, which is easily carried with the user, such as to the meeting. The MFP 9 is an example of a printer. The PC 10 is an example of an individual terminal operated by an individual user. Examples of the individual terminal include a desktop PC, a notebook PC, and a tablet. In this disclosure, the individual terminal is a terminal that is operated by the user such as a terminal owned by the user. The PC 10 does not have to be brought to the meeting, as long as the user is able to access his or her email address using the PC 10.

The image data may be in any suitable format other than RPCS, such as in Printer Control Language (PCL), Page Description Language (PDL), and Post Script (PS).

In FIG. 1, the user A, who owns the IC card 3, brings the IC card 3 to a meeting being held with the electronic whiteboard 2. The user B, who owns the smartphone 4, brings the smartphone 4 to the meeting being held with the electronic whiteboard 2. The PC 10a is any PC owned by the user A. The PC 10b is any PC owned by the user B. In one example, the electronic whiteboard 2 may have a videoconference capability, to carry out a videoconference with the videoconference terminal 13 by communicating video data and audio data through the communication network 100.

The terminal management server 5 manages, for each privately-owned terminal, terminal identification (ID) identifying the privately-owned terminal. The destination management server 6 manages an email address of the PC 10 owned by each user. In this disclosure, the email address of the PC owned by each user is an email address of each user, and the email address is stored in the destination management server 6 in association with the user ID. The mail server 7 controls transmission or reception of electronic mails (emails) through the communication network 100. The print server 8 stores data reflecting the image data transmitted from the electronic whiteboard 2 or PC 10 (in this disclosure, print data), and, in response to a request from the MFP 9, transmits the data reflecting the image data to the MFP 9.

<Hardware Configuration>

Referring to FIGS. 2 to 7, a hardware configuration of the apparatus or terminal in the communication system 1 is described according to the embodiment.

<Hardware Configuration of Electronic Whiteboard>

Figure 2:
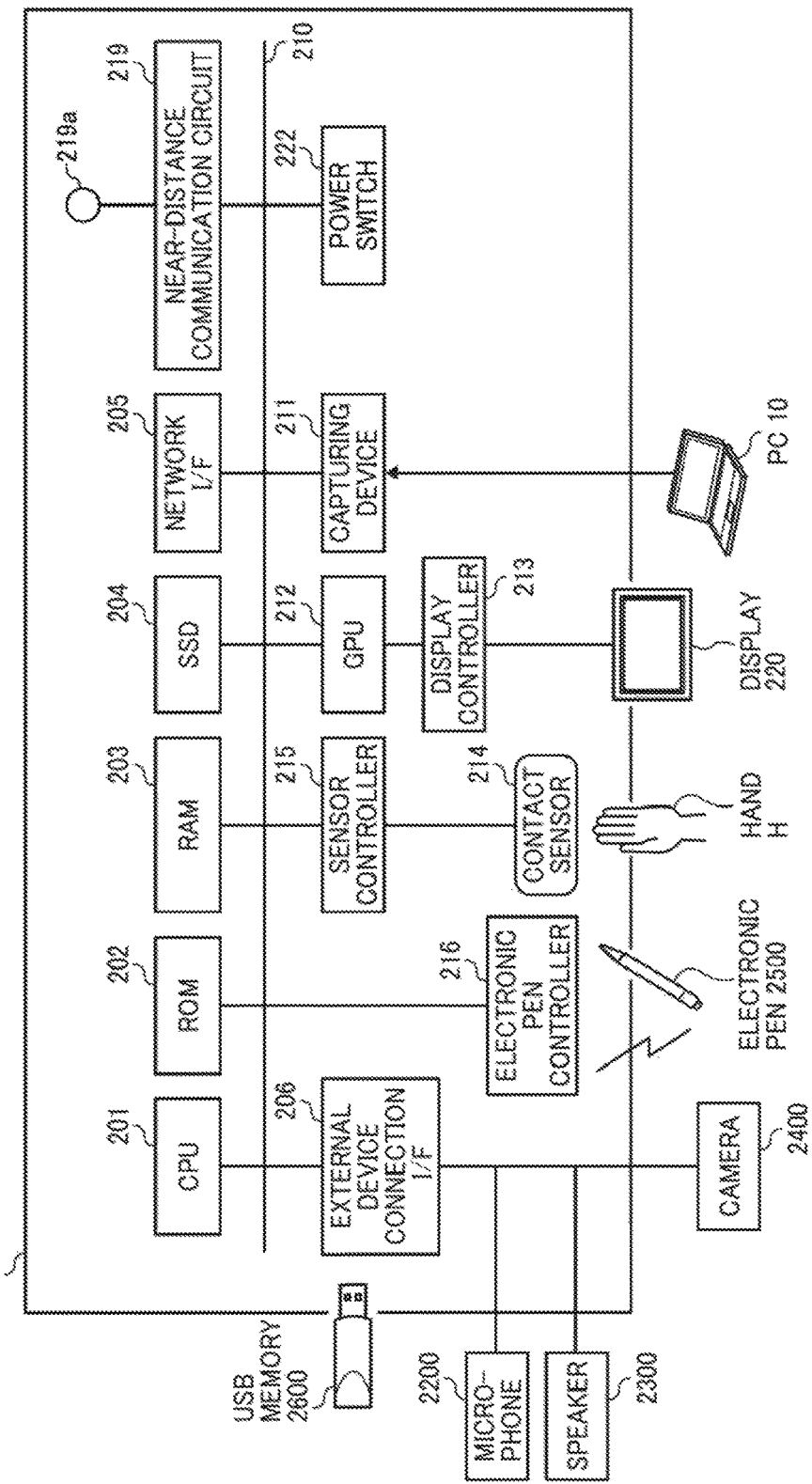
FIG. 2 is a schematic block diagram illustrating a hardware configuration of an electronic whiteboard, according to an embodiment.

FIG. 2 is a diagram illustrating a hardware configuration of the electronic whiteboard 2, according to the embodiment. As illustrated in FIG. 2, the electronic whiteboard 2 includes a central processing unit (CPU) 201, a read only memory (ROM) 202, a random access memory (RAM) 203, a solid state drive (SSD) 204, a network interface (I/F) 205, and an external device connection interface (I/F) 206.

The CPU 201 controls entire operation of the electronic whiteboard 2. The ROM 202 stores a control program for operating the CPU 201 such as an Initial Program Loader (IPL). The RAM 203 is used as a work area for the CPU 201. The SSD 204 stores various data such as the control program for the electronic whiteboard 2. The network I/F 205 controls communication with an external device through the communication network 100. The external device connection I/F 206 controls communication with a universal serial bus (USB) memory 2600, and external devices such as a camera 2400, a speaker 2300, a microphone 2200, etc.

The electronic whiteboard 2 further includes a capturing device 211, a graphics processing unit (GPU) 212, a display controller 213, a contact sensor 214, a sensor controller 215, an electronic pen controller 216, a near-distance communication circuit 219, and an antenna 219a for the near-distance communication circuit 219, and a power switch 222.

The capturing device 211 causes a display 508 of the PC 10 to display a still image or a video image based on image data. The GPU 212 is a semiconductor chip dedicated to processing a graphical image. The display controller 213 controls display of an image processed at the GPU 212 for output through the display 220 provided with the electronic whiteboard 2. The contact sensor 214 detects a touch onto the display 220 with an electronic pen 2500 or a user's hand H. The sensor controller 215 controls operation of the contact sensor 214. The contact sensor 214 senses a touch input to a specific coordinate on the display 220 using the infrared blocking system. More specifically, the display 220 is provided with two light receiving elements disposed on both upper side ends of the display 220, and a reflector frame disposed at the sides of the display 220. The light receiving elements emit a plurality of infrared rays in parallel to a surface of the display 220. The light receiving elements receive lights passing in the direction that is the same as an optical path of the emitted infrared rays, which are reflected by the reflector frame. The contact sensor 214 outputs an identifier (ID) of the infrared ray that is blocked by an object after being emitted from the light receiving elements, to the sensor controller 215. Based on the ID of the infrared ray, the sensor controller 215 detects a specific coordinate that is touched by the object. The electronic pen controller 216 communicates with the electronic pen 2500 to detect a touch by the tip or bottom of the electronic pen 2500 to the display 220. The near-distance communication circuit 219 is a communication circuit that communicates in compliance with the NFC, the Bluetooth, and the like.

The power switch 222 is a switch that receives an instruction to turn on or off the power of the electronic whiteboard 2.

The electronic whiteboard 2 further includes a bus line 210. The bus line 210 is an address bus or a data bus, which electrically connects the elements in FIG. 2 such as the CPU 201.

The contact sensor 214 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition or in alternative to detecting a touch by the tip or bottom of the electronic pen 2500, the electronic pen controller 216 may also detect a touch by another part of the electronic pen 2500, such as a part held by a hand of the user.

<Hardware Configuration of IC Card>

Figure 3:
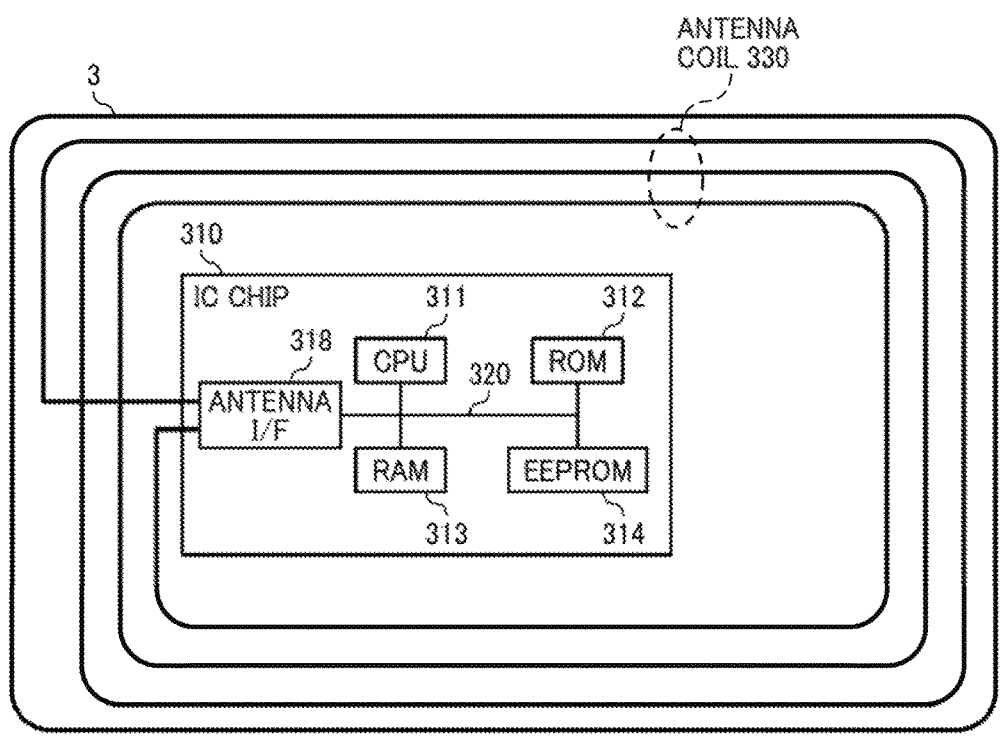
FIG. 3 is a schematic block diagram illustrating a hardware configuration of an integrated circuit (IC) card, according to an embodiment.

FIG. 3 is a diagram illustrating a hardware configuration of the IC card 3 according to the embodiment. In this disclosure, the contactless IC card is described, but contact IC card may be applied instead. As illustrated in FIG. 3, the IC card 3 includes an IC chip 310 and an antenna coil 330. The IC chip 310 further includes a CPU 311, a ROM 312, a RAM 313, an Electrically Erasable and Programmable ROM (EEPROM) 314, and an antenna I/F 318.

The CPU 311 controls entire operation of the IC card 3. The ROM 312 stores a control program for operating the CPU 311. The RAM 313 is used as a work area for the CPU 311. The EEPROM 314 stores various data such as the control program for the IC card 3, and terminal ID for identifying the IC card 3, and the like. The antenna I/F 318 controls transmission or reception of data with an external device via the antenna coil 330.

The IC card 3 further includes a bus line 320. The bus line 320 is an address bus or a data bus, which electrically connects the elements in FIG. 3 such as the CPU 311.

The antenna coil 330 generates an electric current, which is induced as the IC card 3 passes an electromagnetic field generated by radio waves emitted from an external device such as a reader and writer. The IC card 3 uses the generated electric current to activate the IC chip 310, and communicates with the external device, that is the reader and writer, to obtain or provide data with the external device.

<Hardware Configuration of Smartphone>

Figure 4:
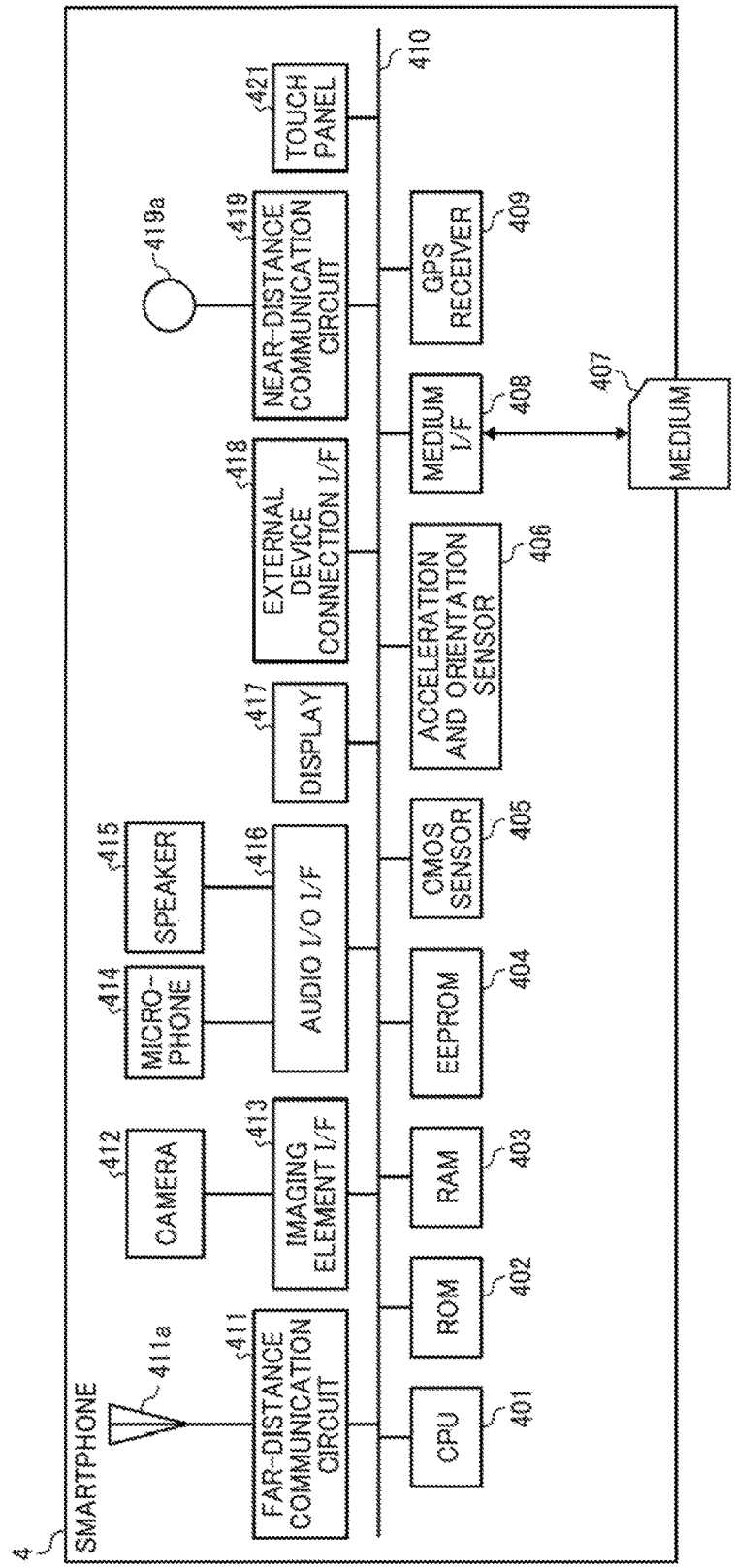
FIG. 4 is a schematic block diagram illustrating a hardware configuration of a smartphone, according to an embodiment.

FIG. 4 is a diagram illustrating a hardware configuration of the smartphone 4 according to the embodiment. As illustrated in FIG. 4, the smartphone 4 includes a CPU 401, a ROM 402, a RAM 403, an EEPROM 404, a Complementary Metal Oxide Semiconductor (CMOS) sensor 405, an acceleration and orientation sensor 406, a medium I/F 408, and a global positioning system (GPS) receiver 409.

The CPU 401 controls entire operation of the smartphone 4. The ROM 402 stores a control program for controlling the CPU 401 such as an IPL. The RAM 403 is used as a work area for the CPU 401. The EEPROM 404 reads or writes various data such as a control program for the smartphone 4 under control of the CPU 401. The CMOS sensor 405 captures an object (mainly, the user operating the smartphone 4) under control of the CPU 401 to obtain captured image data. The acceleration and orientation sensor 406 includes various sensors such as an electromagnetic compass or gyrocompass for detecting geomagnetism, and an acceleration sensor. The medium I/F 408 controls reading or writing of data with respect to a recording medium 407 such as a flash memory. The GPS receiver 409 receives a GPS signal from a GPS satellite.

The smartphone 4 further includes a far-distance communication circuit 411, a camera 412, an imaging element I/F 413, a microphone 414, a speaker 415, an audio input/output I/F 416, a display 417, an external device connection I/F 418, a near-distance communication circuit 419, an antenna 419a for the near-distance communication circuit 419, and a touch panel 421.

The far-distance communication circuit 411 is a circuit that communicates with other device through the communication network 100. The camera 412 is an example of imaging device capable of capturing a subject to obtain image data under control of the CPU 401, and is incorporated in the smartphone 4. The imaging element I/F 413 is a circuit that controls driving of the camera 412. The microphone 414 is an example of audio collecting device capable of inputting audio under control of the CPU 401, and is incorporated in the smartphone 4. The audio I/O I/F 416 is a circuit for inputting or outputting an audio signal between the microphone 414 and the speaker 415 under control of the CPU 401. The display 417 may be a liquid crystal or organic electro luminescence (EL) display that displays an image of a subject, an operation icon, or the like. The external device connection I/F 418 is an interface circuit that connects the smartphone 4 to various external devices. The near-distance communication circuit 419 is a communication circuit that communicates in compliance with the NFC, the Bluetooth, and the like. The touch panel 421 is an example of input device that enables the user to input a user instruction to the smartphone 4 through touching a screen of the display 417.

The smartphone 4 further includes a bus line 410. The bus line 410 is an address bus or a data bus, which electrically connects the elements in FIG. 4 such as the CPU 401.

<Hardware Configuration of Server and PC>

Figure 5:
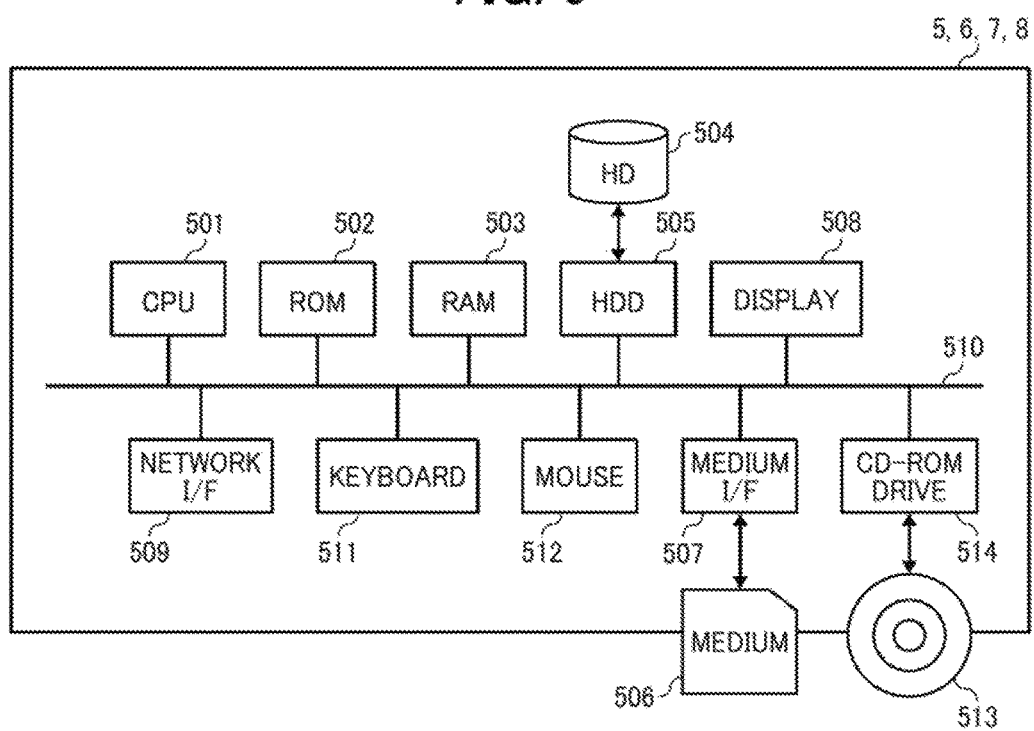
FIG. 5 is a schematic block diagram illustrating a hardware configuration of a sever or a personal computer (PC), according to an embodiment.

FIG. 5 is a diagram illustrating a hardware configuration of the server and the PC, according to the embodiment. In this disclosure, since the terminal management server 5, destination management server 6, mail server 7, print server 8, PC 10a, and PC 10b have a substantially the same hardware structure, a hardware configuration of the terminal management server 5 is described below as an example. In the following description, even in case of describing the hardware configuration of the destination management server 6, mail server 7, print server 8, PC 10a, and PC 10b, the elements in FIG. 5 are referred.

As illustrated in FIG. 5, the terminal management server 5, which may be implemented by a computer, includes a CPU 501, a ROM 502, a RAM. 503, a hard disk (HD) 504, a hard disk drive (HDD) 505, a recording medium 506, a medium I/F 507, a display 508, a network I/F 509, a keyboard 511, a mouse 512, a CD-ROM drive 514, and a bus line 510. Since the terminal management server 5 operates as a server, an input device such as the keyboard 511 and the mouse 512, or an output device such as the display 508 does not have to be provided.

The CPU 501 controls entire operation of the terminal management server 5. The ROM 502 stores a control program for controlling the CPU 501 such as an IPL. The RAM 503 is used as a work area for the CPU 501. The HD 504 stores various data such as a control program. The HDD 505 controls reading or writing of various data to or from the HD 504 under control of the CPU 501. The medium I/F 507 controls reading or writing of data with respect to a recording medium 506 such as a flash memory. The display 508 displays various information such as a cursor, menu, window, characters, or image. The network I/F 509 is an interface that controls communication of data with an external device through the communication network 100. The keyboard 511 is one example of input device provided with a plurality of keys for allowing a user to input characters, numerals, or various instructions. The mouse 512 is one example of input device for allowing the user to select a specific instruction or execution, select a target for processing, or move a cursor being displayed. The CD-ROM drive 514 reads or writes various data with respect to a Compact Disc ROM (CD-ROM) 513, which is one example of removable recording medium.

The terminal management server 5 further includes a bus line 510. The bus line 510 may be an address bus or a data bus, which electrically connects various elements such as the CPU 501 of FIG. 5.

<Hardware Configuration of MFP>

Figure 6:
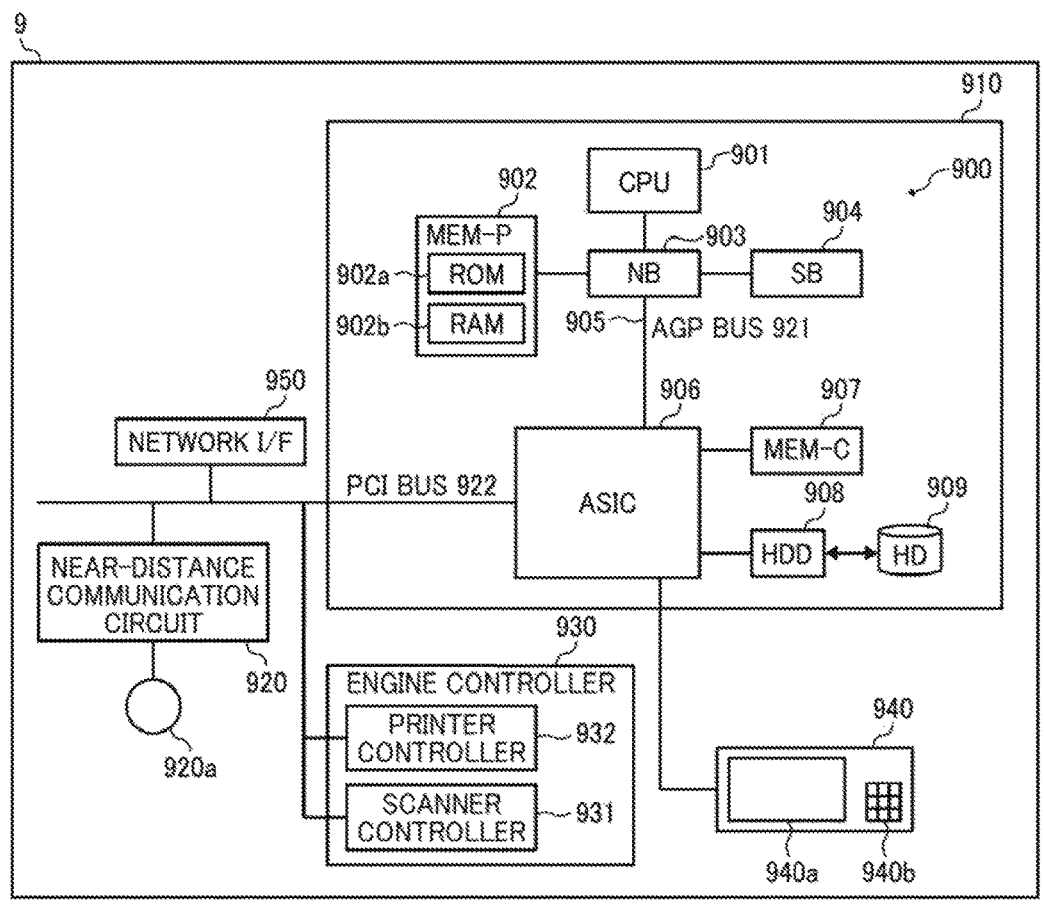
FIG. 6 is a schematic block diagram illustrating a hardware configuration of a multifunctional peripheral (MFP), according to an embodiment of the present disclosure.

FIG. 6 is a diagram illustrating a hardware configuration of the MFP 9, according to the embodiment. As illustrated in FIG. 6, the MFP 9 includes a controller 910, a near-distance communication circuit 920, an engine controller 930, a control panel 940, and a network I/F 950.

The controller 910 includes a CPU 901 as a main processor, a system memory (MEM-P) 902, a north bridge (NB) 903, a south bridge (SB) 904, an Application Specific Integrated Circuit (ASIC) 906, a local memory (MEM-C) 907, a HDD 908, and a HD 909. The NB 903 and the ASIC 906 are connected through an Accelerated Graphics Port (AGP) bus 921.

The CPU 901 controls entire operation of the MFP 9. The NB 903 connects the CPU 901, with the MEM-P 902, SB 904, and AGP bus 921. The NB 903 includes a memory controller for controlling reading or writing of various data with respect to the MEM-P 902, a Peripheral Component Interconnect (PCI) master, and an AGP target.

The MEM-P 902 includes a ROM 902a as a memory that stores program and data for achieving various functions of the controller 910. The MEM-P 902 further includes a RAM 902b as a memory that deploys the program and data, or as a drawing memory that stores drawing data for printing. The program stored in the RAM 902b may be stored in any computer-readable recording medium, such as a CD-ROM, floppy disk (FD), CD-R, or DVD, in a file format installable and executable by the computer, for distribution.

The SB 904 connects the NB 903 with a PCI bus 922 or a peripheral device. The ASIC 906 is an integrated circuit (IC) dedicated to image processing, and connects the AGP bus 921, PCI bus 922, HDD 908, and MEM-C 907. The ASIC 906 includes a PCI target, an AGP master, an arbiter (ARB) as a central processor, a memory controller for controlling the MEM-C 907, a plurality of direct memory access controllers (DMACs) capable of converting coordinates of image data with a hardware logic, and a PCI unit that transfers data between the scanner controller 931 and the printer controller 932 through the PCI bus 922. The ASIC 906 may be connected to a Universal Serial Bus (USB) interface, or the Institute of Electrical and Electronics Engineers 1394 (IEEE1394) interface.

The MEM-C 907 is a local memory, which is used as a buffer for image data to be printed or code image. The HD 909 stores various image data, font data for printing, and form data. The HDD 908 reads or writes various data from or to the HD 909 under control of the CPU 901. The AGP bus 921 is a bus interface for a graphics accelerator card, which has been proposed to accelerate graphics processing. Through directly accessing the MEM-P 902 by high-throughput, processes by the AGP bus 921 can be accelerated.

The near-distance communication circuit 920 is provided with an antenna 920a for near-distance communication. The near-distance communication circuit 920 is a communication circuit that communicates in compliance with the NFC, the Bluetooth, and the like.

The engine controller 930 includes a scanner controller 931 and a printer controller 932. The control panel 940 includes a display 940a and various keys 940b. The control panel 940 displays current settings or a selection screen, and is provided with a touch panel for receiving a user input. The keys 940b, which include such as a ten key and a Start key, are used by the user to enter set values of various image forming parameters such as image density parameter. The controller 910 controls entire operation of the MFP 9. In example operation, the controller 910 controls drawing, communication, or user inputs to the control panel 940. The scanner controller 931 and the printer controller 932 each performs various image processing, such as error diffusion or gamma conversion.

In response to an instruction to select a specific application through the control panel 940, for example, using a mode switch key, the MFP 9 selectively performs a document box function, copy function, print function, and facsimile function. When the document box function is selected, the MFP 9 changes its operating mode to a document box mode to store document data. With selection of the copy function, the MFP 9 operates in a copy mode. With selection of the print function, the MFP 9 operates in a printer mode. With selection of the facsimile function, the MFP 9 operates in a facsimile mode.

The network I/F 950 controls communication of data with an external device through the communication network 100. The near-distance communication circuit 920 and the network I/F 950 are electrically connected to the ASIC 906 via the PCI bus 922.

<Hardware Configuration of Videoconference Terminal>

Figure 7:
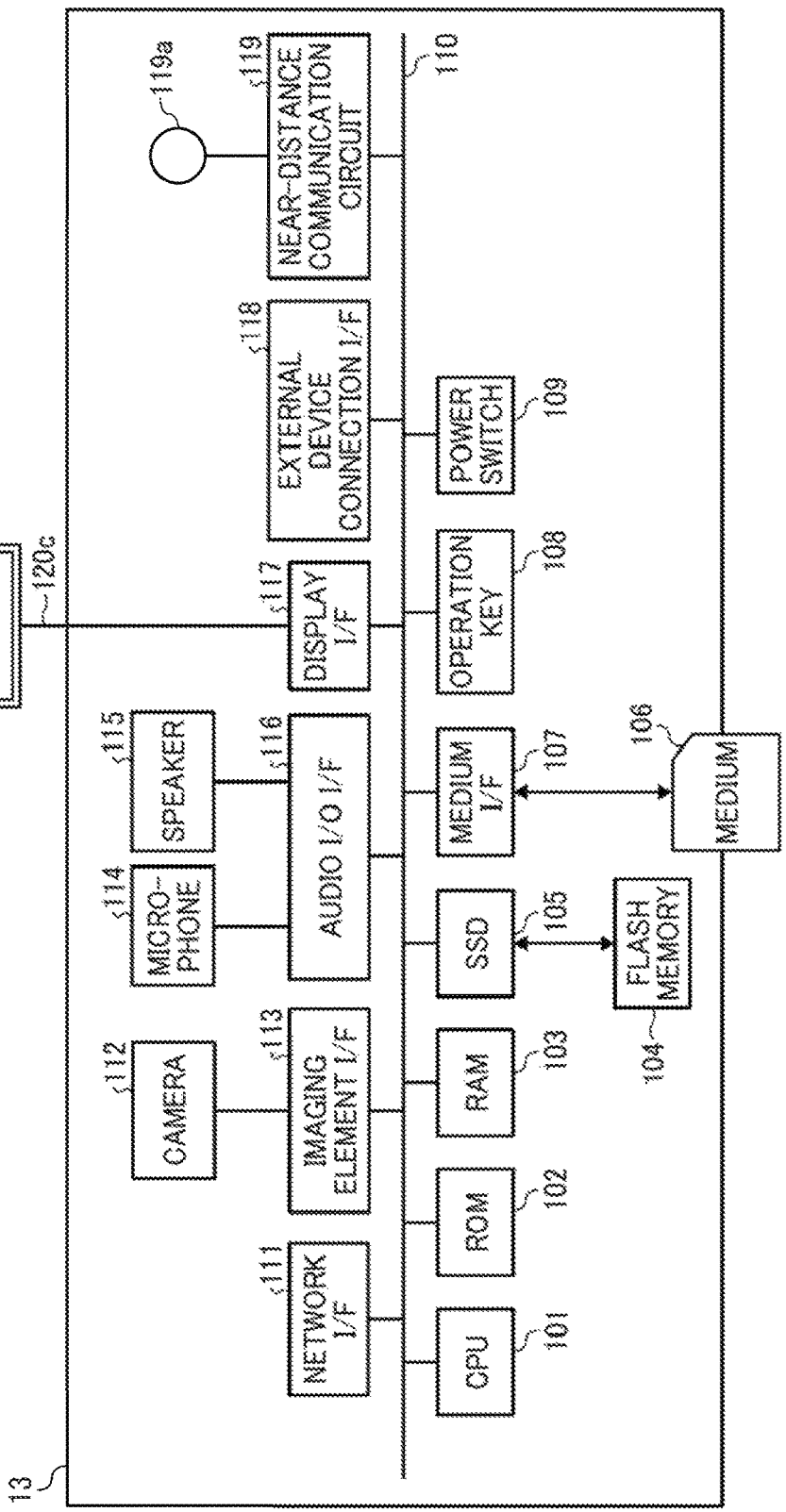
FIG. 7 is a schematic block diagram illustrating a hardware configuration of a videoconference terminal, according to an embodiment.

FIG. 7 is a diagram illustrating a hardware configuration of the videoconference terminal 13 according to the embodiment. As illustrated in FIG. 7, the videoconference terminal 13 includes a CPU 101, a ROM 102, a RAM 103, a flash memory 104, an SSD 105, a medium I/F 107, an operation key 108, a power switch 109, a bus line 110, a network I/F 111, a camera 112, an imaging element I/F 113, a microphone 114, a speaker 115, an audio input/output I/F 116, a display I/F 117, an external device connection I/F 118, a near-distance communication circuit 119, and an antenna 119a for the near-distance communication circuit 119. The CPU 101 controls entire operation of the videoconference terminal 13. The ROM 102 stores a control program for controlling the CPU 101 such as an IPL. The RAM 103 is used as a work area for the CPU 101. The flash memory 104 stores various data such as a communication control program, image data, and audio data. The SSD 105 controls reading or writing of various data to or from the flash memory 104 under control of the CPU 101. In alternative to the SSD, a hard disk drive (HDD) may be used. The medium I/F 107 controls reading or writing of data with respect to a recording medium 106 such as a flash memory. The operation key (keys) 108 is operated by a user to input a user instruction such as a user selection of a communication destination of the videoconference terminal 13. The power switch 109 is a switch that receives an instruction to turn on or off the power of the videoconference terminal 13.

The network I/F 111 allows communication of data with an external device through the communication network 100 such as the Internet. The camera 112 is an example of built-in imaging device capable of capturing a subject to obtain image data under control of the CPU 101. The imaging element I/F 113 is a circuit that controls driving of the camera 112. The microphone 114 is an example of built-in audio collecting device capable of inputting audio under control of the CPU 101. The audio I/O I/F 116 is a circuit for inputting or outputting an audio signal between the microphone 114 and the speaker 115 under control of the CPU 101. The display I/F 117 is a circuit for transmitting image data to an external display 120 under control of the CPU 101. The external device connection I/F 118 is an interface circuit that connects the videoconference terminal 13 to various external devices. The near-distance communication circuit 119 is a communication circuit that communicates in compliance with the NFC, the Bluetooth, and the like.

The bus line 110 may be an address bus or a data bus, which electrically connects various elements such as the CPU 101 of FIG. 7.

The display 120 is an example of a displaying unit, such as a liquid crystal or organic electroluminescence (EL) display that displays an image of a subject, an operation icon, or the like. The display 120 is connected to the display I/F 117 by a cable 120c. The cable 120c may be an analog red green blue (RGB) (video graphic array (VGA)) signal cable, a component video cable, a high-definition multimedia interface (HDMI) (registered trademark) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used. The external device connection I/F 118 is capable of connecting an external device such as an external camera, an external microphone, or an external speaker through a USB cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

The recording medium 106 is removable from the videoconference terminal 13. The recording medium 106 can be any non-volatile memory that reads or writes data under control of the CPU 101, such that any memory such as an EEPROM may be used instead of the flash memory 104.

Example Screens of Electronic Whiteboard

Figure 8A:
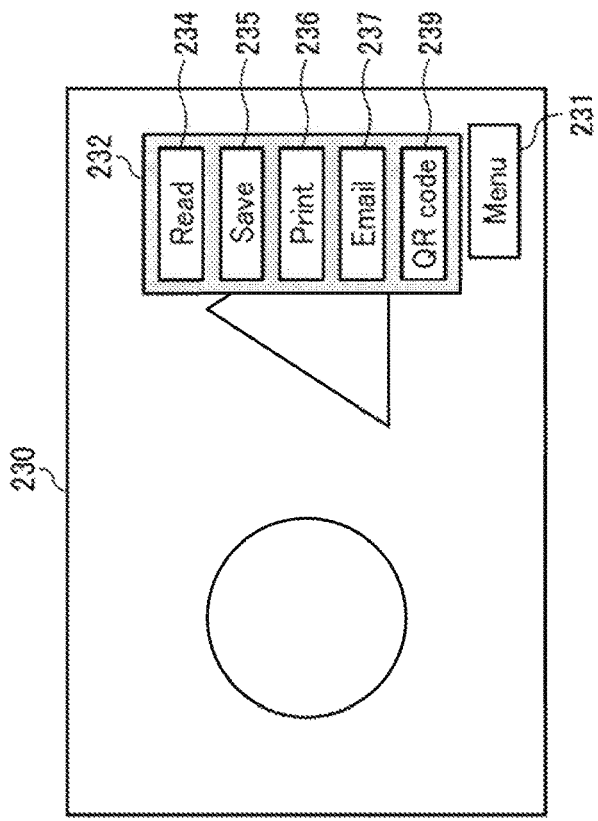
FIGS. 8A and 8B are each an example screen displayed by a display at the electronic whiteboard.
Figure 8B:
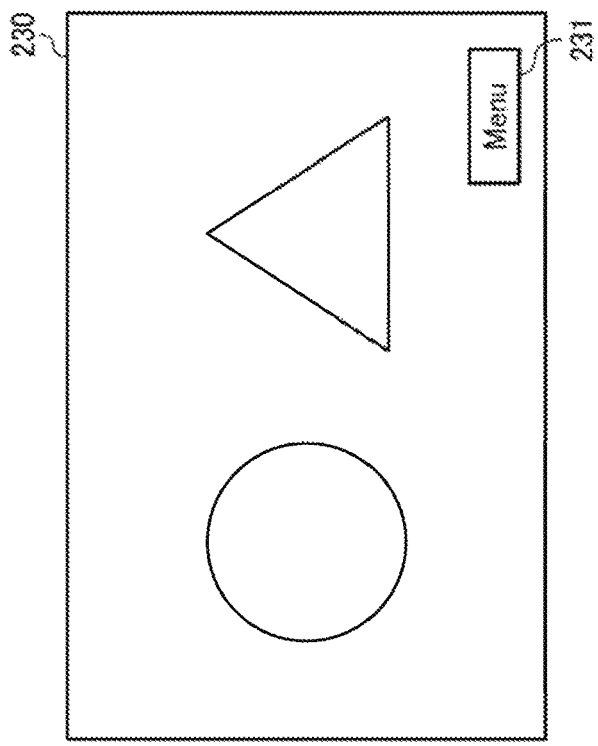

Referring to FIGS. 8A-8B, FIGS. 9A-9D, and FIGS. 10A-10C, example screens of the electronic whiteboard 2 are described according to the embodiment. FIGS. 8A-8B, FIGS. 9A-9D, and FIGS. 10A-10C each illustrates a screen displayed by the electronic whiteboard 2. The electronic whiteboard 2 displays, on the display 220, a drawing image screen 230 as illustrated in FIG. 8A, for example. The drawing image screen 230 displays a drawing image (such as a circle and a triangle in figure) drawn by the user with such as the electronic pen 2500. The drawing image screen 230 displays a "Menu" button 231 at the lower right. The "Menu" button 231 is a graphical image, which, when selected by the user, causes the electronic whiteboard 2 to perform various types of functions of the electronic whiteboard 2. When the user presses the "Menu" button 231 with such as the electronic pen 2500, as illustrated in FIG. 8B, the electronic whiteboard 2 displays, on the drawing image screen 230, a menu selection window (image) 232 for allowing selection of a function provided by the electronic whiteboard 2.

As illustrated in FIG. 8B, the menu selection window 232 includes a "Read" button 234, a "Save" button 235, a "Print" button 236, an "Email" button 237, and a "QR code" button 239.

Of those buttons, the "Read" button 234 is a graphical image, which, when selected, causes the electronic whiteboard 2 to read drawing image data that is stored in the SSD 204 after the image is drawn, for display onto the display 220. The "Save" button 235 is a graphical image, which, when selected, causes the electronic whiteboard 2 to store the drawing image drawn by the user in the SSD 204 as the drawing image data. The "Print" button 236 is a graphical image, which, when selected, causes the electronic whiteboard 2 to print the drawing image displayed on the drawing image screen 230 using such as the MFP 9. The "Email" button 237 is a graphical image, which, when selected, causes the electronic whiteboard 2 to transmit, to the PC 10a or the PC 10b, etc., the drawing image displayed on the drawing image screen 230, as the drawing image data attached to the email. The "QR code" button 239 is a graphical image, which, when selected, causes the electronic whiteboard 2 to display, on the display 220, a QR code (registered trademark) embedded with a device ID identifying the own device (that is, the electronic whiteboard 2).

Next, example screens to be displayed by the electronic whiteboard 2 when the buttons 234 to 237 and 239 are respectively selected, are described.

Figure 9B:
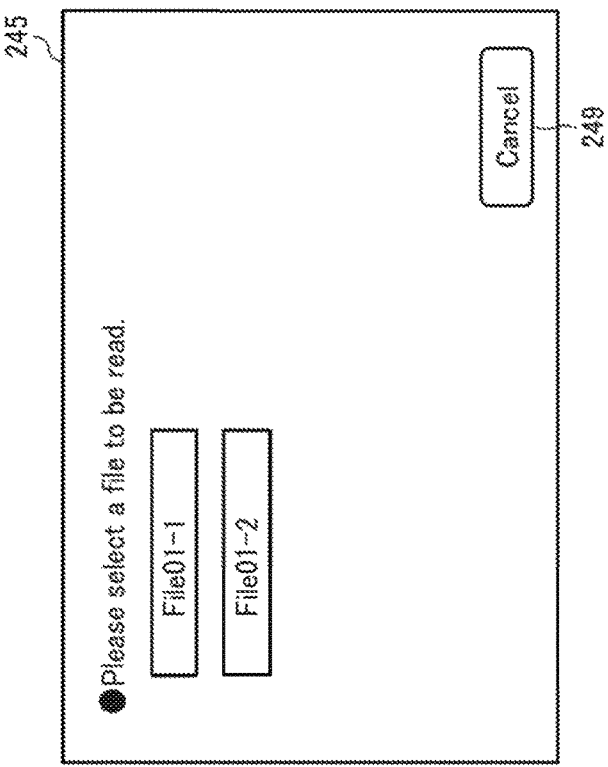
FIGS. 9A, 9B, 9C, and 9D are each an example screen displayed by the display at the electronic whiteboard.
Figure 9A:
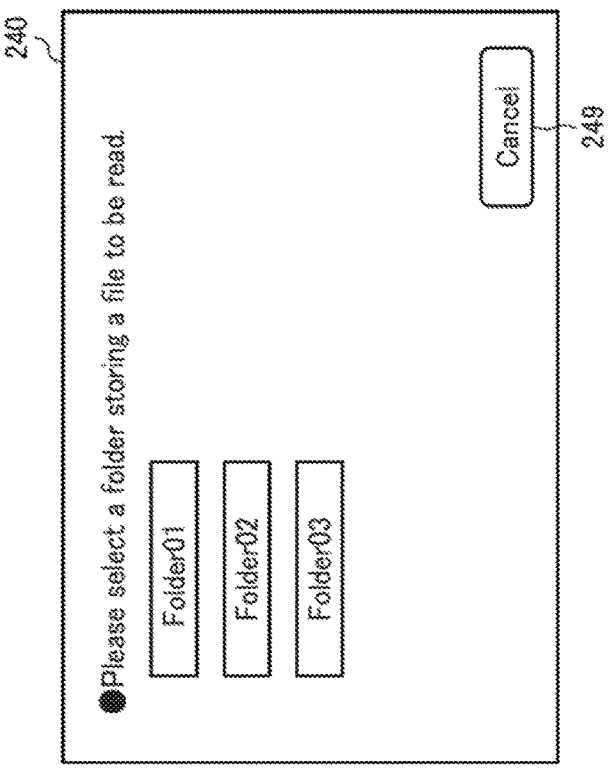

In response to pressing of the "Read" button 234 by the user, the electronic whiteboard 2 controls the display 220 to display a folder selection screen 240 as illustrated in FIG. 9A. The folder selection screen 240 displays a plurality of folder icons to be used for selecting a folder storing an electronic file to be read. When the user selects a desired folder icon ("folder 01", for example) with the electronic pen 2500, the electronic whiteboard 2 displays, on the display 220, a file selection screen 245 as illustrated in FIG. 9B. The file selection screen 245 displays a plurality of file icons to be used for selecting an electronic file to be read. When the user selects a desired file icon with the electronic pen 2500, the electronic whiteboard 2 displays, on the display 220, a drawing image screen 230 including a drawing image of the selected file, as illustrated in FIG. 8A.

Figure 9D:
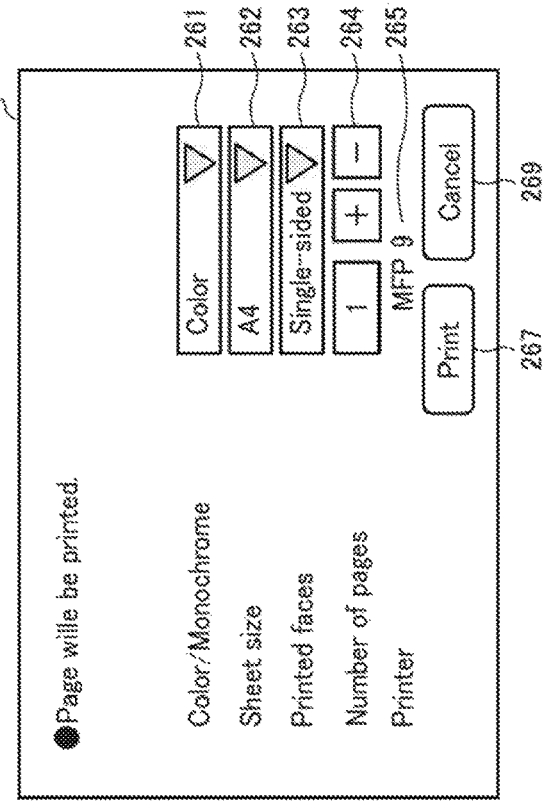
Figure 9C:
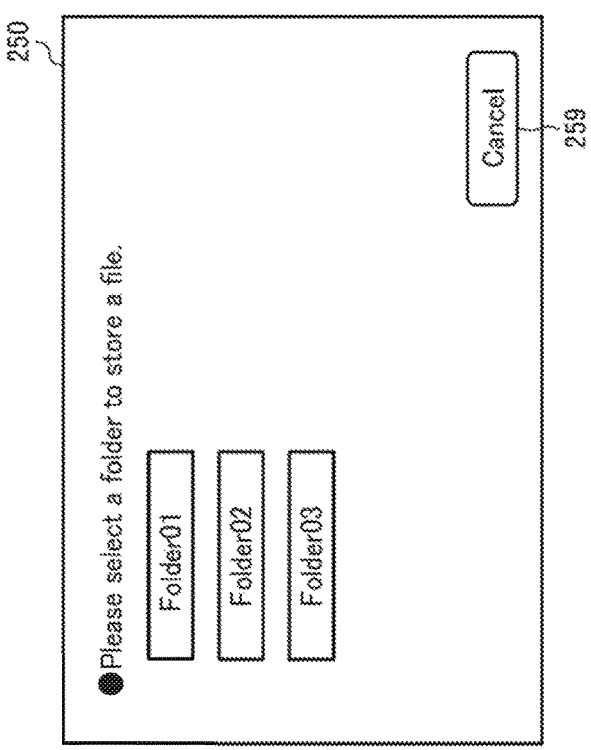

In response to pressing of the "Save" button 235 by the user, the electronic whiteboard 2 controls the display 220 to display a folder selection screen 250 as illustrated in FIG. 9C. The folder selection screen 250 displays a plurality of folder icons to be used for selecting a folder to store an electronic file. The user selects the folder to store the electronic file, by selecting a desired folder icon with the electronic pen 2500.

In response to pressing of the "Print" button 236 by the user, the electronic whiteboard 2 controls the display 220 to display a print configuration screen 260 as illustrated in FIG. 9D. The print configuration screen 260 displays various types of print parameters, and a pull-down menu to be used for changing a configuration for each of the print parameters. The print configuration screen 260 includes the menus 261 to 264, respectively, for selecting color or monochrome printing, selecting a sheet size (A4, A3, etc.), selecting faces to be printed (single-sided or duplex), and selecting the increase or decrease of a number of pages to be printed. The print configuration screen 260 further displays, in a field 265, a device name identifying a printer to print (in this example, "MFP 9"). The print configuration screen 260 displays a "Print" button 267 to be pressed by the user to start printing. For each of the screens illustrated in FIGS. 9A, 9B, 9C, and 9D, "Cancel" buttons 249, 259, and 269 are displayed to return to the drawing image screen 230 illustrated in FIG. 8A.

Figure 10A:
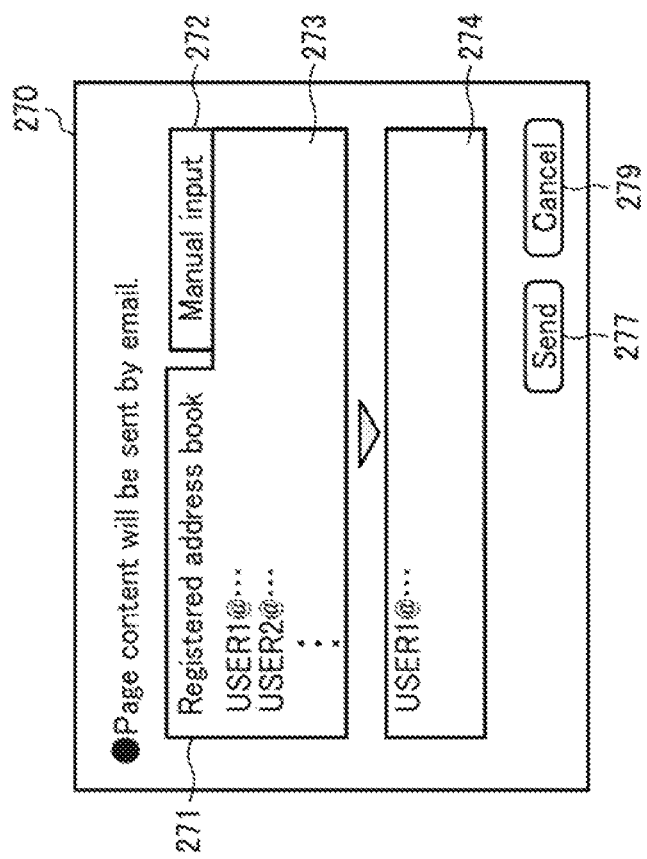
FIGS. 10A, 10B, and 10C are each an example screen displayed by the display at the electronic whiteboard.

In response to pressing of the "Email" button 237 by the user A, a display control 24 of the electronic whiteboard 2 controls the display 220 to display a destination configuration screen 270 illustrated in FIG. 10A. The destination configuration screen 270 includes a "Registered address book" tab 271 for showing registered email addresses, and a "Manual input" tab 272 for allowing the user to manually input an email address with such as the electronic pen 2500. In this example, a case where the "Registered address book" tab 271 is selected is displayed. The destination configuration screen 270 displays a registered address book field 273 that lists the registered email addresses. The destination configuration screen 270 further displays, below the registered address book field 273, an address configuration field 274 that lists one or more email addresses, each representing a destination to which an email is actually sent. In this example, an email address (e.g., "USER1@ . . . ") is displayed, which is transmitted at S19 as described later, when the user A logs in the electronic whiteboard 2. The destination configuration screen 270 further displays a "Send" button 277 to be selected by the user to start transmission of email.

Figure 10B:
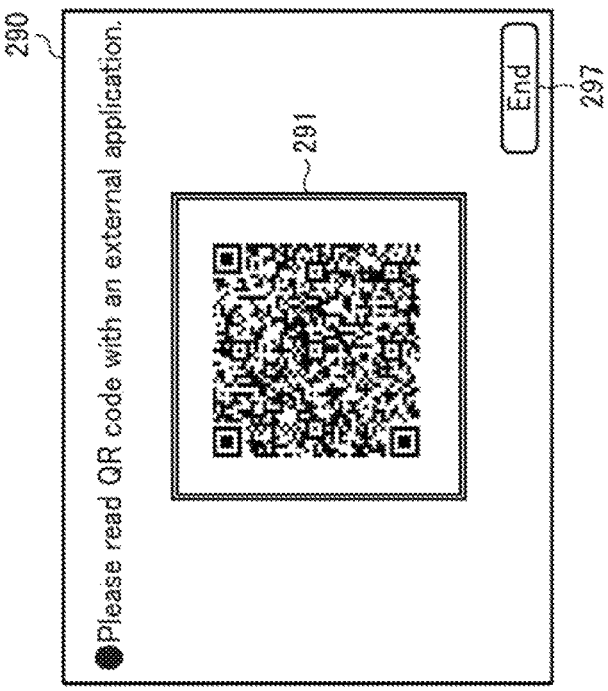

In another example, the electronic whiteboard 2 may display, on the display 220, an email configuration screen 280 as illustrated in FIG. 10B, as a screen to be displayed to an administrator or a service engineer, but not to the general user. The email configuration screen 280 includes a server address field 281, a port number field 282, a sender email address field 283, an authentication requirement field 284, an account field 285, and a password field 286.

The server address field 281 is a field to be entered with an IP address of the mail server 7. The port number field 282 is a field to be entered with a port number of a port that the mail server 7 opens to accept emails. The sender email address field 283 is previously set with an email address assigned to the electronic whiteboard 2, as the electronic whiteboard 2 is an email sender. That is, the email sender is not a user operating the electronic whiteboard 2, but is previously set as the electronic whiteboard 2. The authentication requirement field 284 is a field to be set with information indicating whether or not to request the mail server 7 to authenticate the email sender. The account field 285 and the password field 286 are entered with account information, which is to be used by the mail server 7 to authenticate the electronic whiteboard 2 using Send Mail Transfer Protocol (SMTP).

Figure 10C:
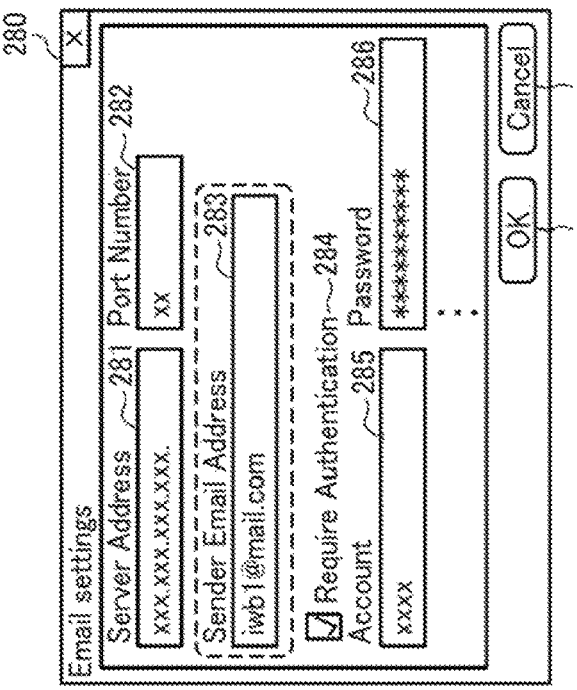

In response to pressing of the "QR code" button 239 by the user, the electronic whiteboard 2 controls the display 220 to display a QR code display screen 290 as illustrated in FIG. 10C. The QR code display screen 290 displays a QR code 291 embedded with the device ID for identifying the electronic whiteboard 2 (the own device). For example, the user activates a QR code reader application installed on such as the smartphone, to cause the activated reader application to read the QR code 291 to obtain the device ID of the electronic whiteboard 2. The QR code display screen 290 further includes an "End" button 297, which switches back from the QR code display screen 290 to the drawing image screen 230. For each of the screens illustrated in FIGS. 10A and 10B, "Cancel" buttons 279 and 289 are displayed to return to the drawing image screen 230 illustrated in FIG. 8A.

Any one of the IDs described above is an example of identification information identifying the device or terminal, or the user operating the device or terminal. The device ID is an example of device identification information. The terminal ID is an example of terminal identification information. The user ID is an example of user identification information. Further, the device identification information and the terminal identification information include a manufacturing number. Furthermore, the user identification information includes an employee number, a driver license number, and an individual number called "My Number" under the Japan's Social Security and Tax Number System.

Further, any one of the above-described control programs may be recorded in a file in a format installable or executable on a computer-readable recording medium for distribution. Examples of the recording medium include, but not limited to, a compact disc-recordable (CD-R), digital versatile disc (DVD)), blue-ray disc, and SD card. In addition, such recording medium may be provided in the form of a program product to users within a certain country or outside that country.

The servers 5, 6, 7, and 8 may be configured by a single computer or a plurality of computers to which divided portions (functions, means, or storages) are arbitrarily allocated.

<Functional Configuration of Communication System>

Figure 11B:
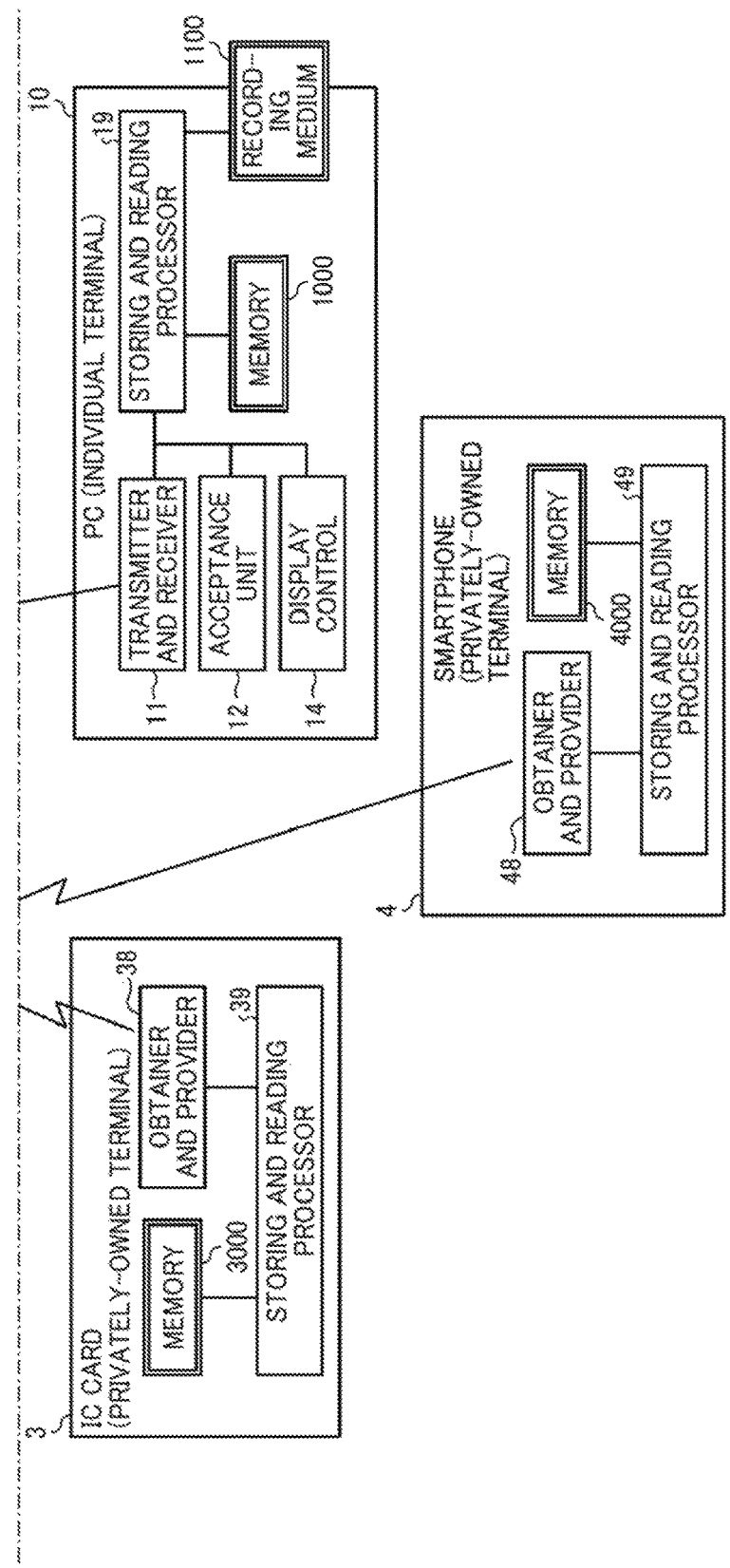

Referring to FIGS. 11A and 11B and FIGS. 12A and 12B, a functional configuration of the communication system 1 is described according to the embodiment. FIGS. 11A and 11B are a diagram illustrating a functional configuration of the communication system 1. In FIGS. 11A and 11B, only a part of those terminals, devices, and servers illustrated in FIG. 1 is illustrated, which relates to processing or operation described below.

<Functional Configuration of Electronic Whiteboard>

As illustrated in FIGS. 11A and 11B, the electronic whiteboard 2 includes a transmitter and receiver 21, an acceptance unit 22, an image and audio processor 23, a display control 24, a determiner 25, a first generator 26a, a second generator 26b, an obtainer and provider 28, and a storing and reading processor 29. These units are functions that are implemented by or that are caused to function by operating any of the elements illustrated in FIG. 2 in cooperation with the instructions of the CPU 201 according to the electronic whiteboard control program expanded from the SSD 204 to the RAM 203. The electronic whiteboard 2 further includes a memory 2000, which is implemented by the RAM 203 and SSD 204 illustrated in FIG. 2.

(Each Functional Unit of Electronic Whiteboard)

Next, each functional unit of the electronic whiteboard 2 is described according to the embodiment. The transmitter and receiver 21, which may be implemented by the instructions of the CPU 201, the network I/F 205, and the external device connection I/F 206, illustrated in FIG. 2, transmits or receives various data (or information) to or from other terminal, apparatus, or system through the communication network 100.

The acceptance unit 22, which is implemented by the instructions of the CPU 201, the contact sensor 214, and the electronic pen controller 216, illustrated in FIG. 2, accepts various inputs from the user.

The image and audio processor 23 is implemented by the instructions of the CPU 201, illustrated in FIG. 2. The image and audio processor 23 applies image processing to image data that is obtained by capturing a subject by the camera 2400. After the audio of the user is converted to an audio signal by the microphone 2200, the image and audio processor 23 applies processing to audio data based on this audio signal. The image and audio processor 23 outputs the audio signal according to the audio data to the speaker 2300, and the speaker 2300 outputs audio. The image and audio processor 23 obtains drawing image data, drawn by the user with the electronic pen 2500 or the user's hand H onto the display 220, and converts the drawing image data to coordinate data. For example, when the electronic whiteboard 2x transmits the coordinate data to the electronic whiteboard 2y at another site, the electronic whiteboard 2y controls the display 220 to display a drawing image having the same content based on the received coordinate data.

The display control 24, which is implemented by the instructions of the CPU 201 illustrated in FIG. 2 and by the display controller 213 illustrated in FIG. 2, controls the display 220 to display a drawing image.

The determiner 25, which is implemented by the instructions of the CPU 201 illustrated in FIG. 2, determines whether the electronic whiteboard 2 has received any terminal ID, for example, from the IC card 3 or the smartphone 4.

The first generator 26a, which is implemented by the instructions of the CPU 201 illustrated in FIG. 2, generates image data in RPCS, from the drawing image data in bitmap that has been generated based on drawing by the user. The image data may be in any suitable format other than RPCS, such as in PDL or PS. The second generator 26b, which is implemented by the instructions of the CPU 201 illustrated in FIG. 2, generates image data in PDF, from the drawing image data in bitmap that has been generated based on drawing by the user.

The obtainer and provider 28, which is implemented by the instructions of the CPU 201 and the near-distance communication circuit 219 with the antenna 219a, illustrated in FIG. 2, communicates with the IC card 3 or the smartphone 4 to obtain or provide data from or to the IC card 3 or the smartphone 4 by near-distance communication.

The storing and reading processor 29, which is implemented by the instructions of the CPU 201 and the SSD 204 illustrated in FIG. 2, performs processing to store various types of data in the memory 2000 or the recording medium 2100 or to read various types of data stored in the memory 2000 or the recording medium 2100. Further, every time image data and audio data are received in performing communication with other electronic whiteboard or videoconference terminal, the memory 2000 overwrites the image data and audio data. The display 220 displays an image based on image data before being overwritten, and the speaker 2300 outputs audio based on audio data before being overwritten. The recording medium 2100 is implemented by the USB memory 2600 illustrated in FIG. 2.

<Functional Configuration of IC Card>

As illustrated in FIG. 11B, the IC card 3 includes an obtainer and provider 38, and a storing and reading processor 39. These units are functions that are implemented by or that are caused to function by operating any of the elements illustrated in FIG. 3 in cooperation with the instructions of the CPU 311 according to the IC card control program expanded from the EEPROM 314 to the RAM 313. The IC card 3 further includes a memory 3000, which is implemented by the RAM 313 and the EEPROM 314 illustrated in FIG. 3.

(Each Functional Unit of IC Card)

Next, each functional unit of the IC card 3 is described according to the embodiment. The obtainer and provider 38, which is implemented by the instructions of the CPU 311 and the antenna coil 330 illustrated in FIG. 3, communicates with the electronic whiteboard 2 to obtain or provide data from or to the electronic whiteboard 2 by near-distance communication.

The storing and reading processor 39, which is implemented by the instructions of the CPU 311 illustrated in FIG. 3, performs processing to store various types of data in the memory 3000 or read various types of data stored in the memory 3000. The memory 3000 stores a terminal ID for identifying the IC card 3 as one example of privately-owned terminal.

<Functional Configuration of Smartphone>

As illustrated in FIG. 11B, the smartphone 4 includes an obtainer and provider 48 and a storing and reading processor 49. These units are functions that are implemented by or that are caused to function by operating any of the elements illustrated in FIG. 4 in cooperation with the instructions of the CPU 401 according to the smartphone control program expanded from the EEPROM 404 to the RAM 403. The smartphone 4 further includes a memory 4000, which is implemented by the RAM 403 and the EEPROM 404 illustrated in FIG. 4.

(Each Functional Unit of Smartphone)

Next, each functional unit of the smartphone 4 is described according to the embodiment. The obtainer and provider 48, which is implemented by the instructions of the CPU 401 and the near-distance communication circuit 419 with the antenna 419a, illustrated in FIG. 4, communicates with the electronic whiteboard 2 to obtain or provide data from or to the electronic whiteboard 2 by near-distance communication.

The storing and reading processor 49, which is implemented by the instructions of the CPU 401 illustrated in FIG. 4, performs processing to store various types of data in the memory 4000 or read various types of data stored in the memory 4000. The memory 4000 stores a terminal ID for identifying the smartphone 4 as one example of privately-owned terminal.

<Functional Configuration of Terminal Management Server>

The terminal management server 5 includes a transmitter and receiver 51, an authenticator 52, a determiner 55, and a storing and reading processor 59. These units are functions that are implemented by or that are caused to function by operating any of the elements illustrated in FIG. 5 in cooperation with the instructions of the CPU 501 according to the terminal control program expanded from the HD 504 to the RAM 503. The terminal management server 5 includes a memory 5000 implemented by the HD 504 illustrated in FIG. 5.

(Terminal Management Table)

FIG. 12A is a conceptual diagram illustrating a terminal management table according to the embodiment. The memory 5000 stores a terminal management DB 5001, which is implemented by the terminal management table illustrated in FIG. 12A. The terminal management table illustrated in FIG. 12A stores, for each one of a plurality of privately-owned terminals (IC card 3, smartphone 4) registered to the terminal management server 5, a user ID identifying a user who owns the privately-owned terminal and a user name in association with the terminal ID identifying the privately-owned terminal.

(Each Functional Unit of Terminal Management Server)

Next, each functional unit of the terminal management server 5 is described in detail according to the embodiment. In the following description of the functional configuration of the terminal management server 5, relationships of one or more hardware elements in FIG. 5 with each functional unit of the terminal management server 5 in FIG. 11A will also be described.

The transmitter and receiver 51 of the terminal management server 5 illustrated in FIG. 11A, which is implemented by the instructions of the CPU 501 illustrated in FIG. 5 and by the network I/F 509 illustrated in FIG. 5, transmits or receives various types of data (or information) to or from another terminal, device, or system via the communication network 100.

The authenticator 52, which is implemented by the instructions of the CPU 501 illustrated in FIG. 5, determines whether a terminal ID transmitted from the electronic whiteboard 2 is a privately-owned terminal (IC card 3, smartphone 4) owned by the authorized user, which is previously registered.

The determiner 55, which is implemented by the instructions of the CPU 501 illustrated in FIG. 5, performs various types of determination.

The storing and reading processor 59, which is implemented by the instructions of the CPU 501 illustrated in FIG. 5 and the HDD 505 illustrated in FIG. 5, performs processing to store various types of data in the memory 5000 or read various types of data stored in the memory 5000.

<Functional Configuration of Destination Management Server>

The destination management server 6 includes a transmitter and receiver 61, and a storing and reading processor 69. These units are functions that are implemented by or that are caused to function by operating any of the elements illustrated in FIG. 5 in cooperation with the instructions of the CPU 501 according to the destination management program expanded from the HD 504 to the RAM 503. The destination management server 6 includes a memory 6000 implemented by the HD 504 illustrated in FIG. 5.

(Destination Management Table)

FIG. 12B is a conceptual diagram illustrating a destination management table according to an embodiment. The memory 6000 stores a destination management DB 6001 implemented by the destination management table illustrated in FIG. 12B. The destination management table stores, for each of one or more registered users being managed by the destination management server 6, a user ID identifying the user and an email address of the PC 10 of the user, in association with each other.

(Each Functional Unit of Destination Management Server)

Next, each functional unit of the destination management server 6 is described in detail according to the embodiment. In the following description of the functional configuration of the destination management server 6, relationships of the hardware elements in FIG. 5 with each functional unit of the destination management server 6 in FIG. 11A will also be described.

The transmitter and receiver 61 of the destination management server 6 illustrated in FIG. 11A, which is implemented by the instructions of the CPU 501 illustrated in FIG. 5 and by the network I/F 509 illustrated in FIG. 5, transmits or receives various types of data (or information) to or from another terminal, device, or system via the communication network 100.

The storing and reading processor 69, which is implemented by the instructions of the CPU 501 illustrated in FIG. 5 and the HDD 505 illustrated in FIG. 5, performs processing to store various types of data in the memory 6000 or read various types of data stored in the memory 6000.

<Functional Configuration of Mail Server>

The mail server 7 includes a transmitter and receiver 71, and a storing and reading processor 79. These units are functions that are implemented by or that are caused to function by operating any of the elements illustrated in FIG. 11A in cooperation with the instructions of the CPU 501 according to the destination management program expanded from the HD 504 to the RAM 503. The mail server 7 includes a memory 7000 implemented by the HD 504 illustrated in FIG. 5.

(Each Functional Unit of Mail Server)

Next, each functional unit of the mail server 7 is described in detail according to the embodiment. In the following description of the functional configuration of the mail server 7, relationships of the hardware elements in FIG. 5 with each functional unit of the mail server 7 in FIG. 11A will also be described.

The transmitter and receiver 71 illustrated in FIG. 11A of the mail server 7, which is implemented by the instructions of the CPU 501 illustrated in FIG. 5 and by the network I/F 509 illustrated in FIG. 5, transmits or receives various types of data (or information) to or from another terminal, device, or system via the communication network 100.

The storing and reading processor 79, which is implemented by the instructions of the CPU 501 illustrated in FIG. 5 and the HDD 505 illustrated in FIG. 5, performs processing to store various types of data in the memory 7000 or read various types of data stored in the memory 7000.

<Functional Configuration of PC>

As illustrated in FIG. 11B, the PC 10 includes a transmitter and receiver 11, an acceptance unit 12, a display control 14, and a storing and reading processor 19. These units are functions that are implemented by or that are caused to function by operating any of the elements illustrated in FIG. 5 in cooperation with the instructions of the CPU 501 according to the terminal control program expanded from the HD 504 to the RAM 503. The PC 10 further includes a memory 1000 implemented by the HD 504 illustrated in FIG. 5.

(Each Functional Unit of PC)

Next, a functional configuration of the PC 10 is described in detail. The transmitter and receiver 11 of the PC 10 illustrated in FIG. 11B, which is implemented by the instructions of the CPU 501 illustrated in FIG. 5 and by the network I/F 509 illustrated in FIG. 5, transmits or receives various types of data (or information) to or from another terminal, device, or system via the communication network 100.

The acceptance unit 12, which is implemented by the instructions of the CPU 501, keyboard 511, and mouse 512, illustrated in FIG. 5, accepts various inputs from the user.

The display control 14, which is implemented by the instructions of the CPU 501 illustrated in FIG. 5, controls the display 508 to display such as a drawing image.

The storing and reading processor 19, which is implemented by the instructions of the CPU 501 and the HDD 505 illustrated in FIG. 5, performs processing to store various types of data in the memory 1000 or the recording medium 1100 or to read various types of data stored in the memory 1000 or the recording medium 1100. The recording medium 1100 is implemented by the recording medium 506 illustrated in FIG. 5.

<Operation>

In the following, operations, performed by the communication system 1, are described according to embodiments of the present disclosure. The following describes an example case in which the user A and the user B are having a meeting in a certain meeting room using the electronic whiteboard 2x, as illustrated in FIG. 1. In this example, the user A performs a login process. After an image is drawn by at least one of the user A and the user B, the electronic whiteboard 2x transmits the drawing image data to at least one of the PC 10a owned by the user A and the PC 10b owned by the user B.

Operation of First Embodiment

Figure 15:
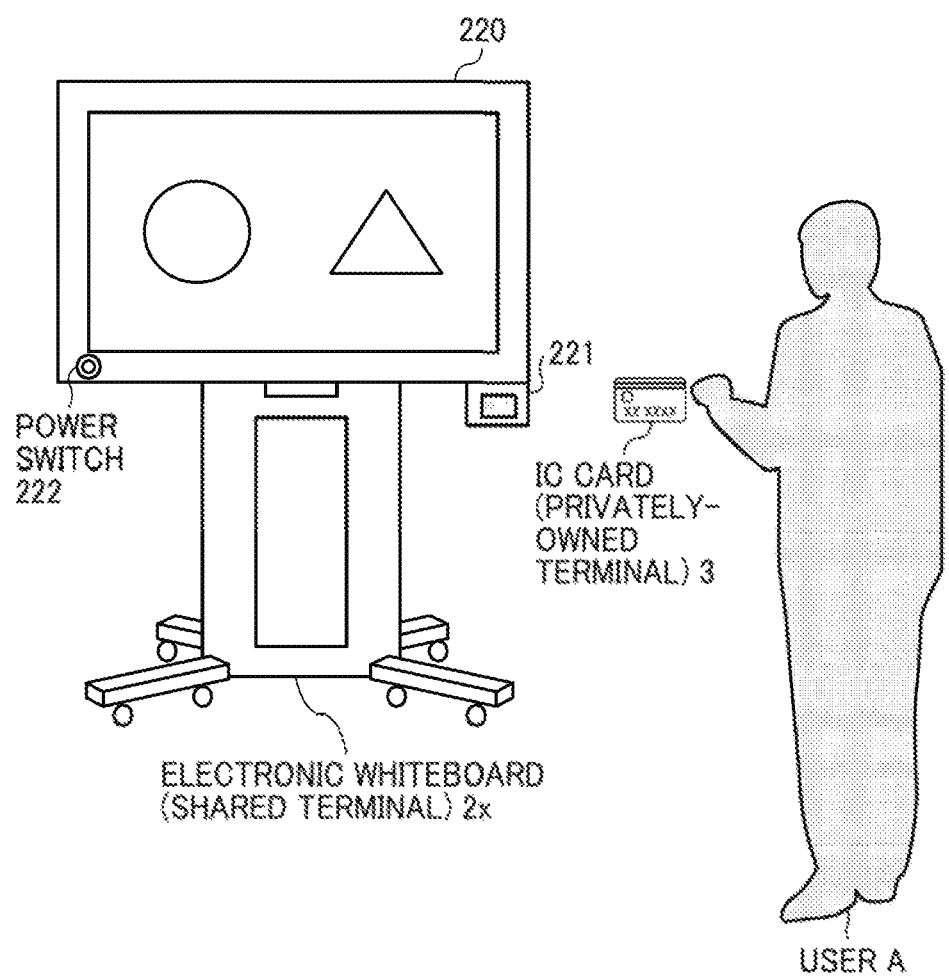
FIG. 15 is an illustration for explaining a use scenario of the electronic whiteboard, according to an embodiment.

Referring to FIGS. 13 to 18, operation of a first embodiment is described. Referring to FIGS. 13 to 15, a description is given of a login process performed by the user A to the electronic whiteboard 2x. FIG. 13 is a sequence diagram illustrating a login process according to the first embodiment.

As illustrated in FIG. 15, in response to pressing of the power switch 222 of the electronic whiteboard 2x by the user, the display control 24 controls the display 220 to display a login screen 170 as illustrated in FIG. 14A (S11). Next, as illustrated in FIG. 15, when the user A brings his or her IC card 3 in proximity of a near-distance communication device 221 of the electronic whiteboard 2x, the obtainer and provider 28 of the electronic whiteboard 2x obtains the terminal ID of the IC card 3 from the obtainer and provider 38 of the IC card 3 (S12). The near-distance communication device 221 corresponds to the near-distance communication circuit 219. The transmitter and receiver 21 of the electronic whiteboard 2x transmits an authentication request to the terminal management server 5 (S13). The authentication request includes the terminal ID obtained at S12. The terminal management server 5 receives the authentication request at the transmitter and receiver 51.

The authenticator 52 of the terminal management server 5 authenticates the IC card 3 using the terminal ID that is obtained (S14). More specifically, the storing and reading processor 59 searches the terminal management table (FIG. 12A) in the terminal management DB 5001 using the terminal ID received at S13 as a search key, to obtain the user ID associated with the terminal ID. When the user ID associated with the terminal ID is found, the authenticator 52 confirms the terminal ID of the IC card 3 to determine that the IC card 3 (terminal ID) is a legitimate IC card owned by the authorized user identified with the user ID that is found. When the user ID associated with the terminal ID is not found, the authenticator 52 determines that the IC card 3 (terminal ID) is not a legitimate IC card owned by the authorized user.

Next, the transmitter and receiver 51 of the terminal management server 5 transmits an authentication result to the electronic whiteboard 2x (S15). When the authenticator 52 determines that the IC card 3 is a legitimate IC card, the authentication result includes information indicating that the IC card 3 is a legitimate IC card, the user ID identifying the user who owns the IC card 3, and the user name. When the authenticator 52 determines that the IC card 3 is not a legitimate IC card, the authentication result includes information indicating that the IC card 3 is not a legitimate IC card. The transmitter and receiver 21 of the electronic whiteboard 2x receives the authentication result.

Next, the electronic whiteboard 2x performs processing based on the authentication result (S16). In one example, when the authentication result includes information indicating that the IC card 3 is not a legitimate IC card, the display control 24 controls the display 220 to display an error notification screen 180 containing an indication indicating that login is not allowed, as illustrated in FIG. 14B. By contrast, when the authentication result includes information indicating that the IC card 3 is a legitimate IC card, the operation proceeds to S17. The following describes the case where the authentication result includes the information indicating that the IC card 3 is a legitimate IC card.

The transmitter and receiver 21 of the electronic whiteboard 2x transmits a request for email address of the user who owns the IC card 3 (user A, in this example) to the destination management server 6 (S17). The email address request includes the user ID that is received at S15. The destination management server 6 receives the email address request at the transmitter and receiver 61.

Next, the storing and reading processor 69 of the destination management server 6 searches the destination management table (FIG. 12B) in the destination management DB 6001, using the user ID received at S17 as a search key, to obtain the email address associated with the user ID (S18). The transmitter and receiver 61 transmits a response to the email address request to the electronic whiteboard 2x (S19). The response includes an email address read at S18, which is associated with the user ID of the user who owns the IC card 3. The electronic whiteboard 2x receives the response to the email address request at the transmitter and receiver 21.

Next, the display control 24 of the electronic whiteboard 2x switches an email address in the sender email address field 283 illustrated in FIG. 10B from the email address assigned to the electronic whiteboard 2x to the email address of the user A that is received at S19 (S20). This switching is performed as internal processing. Accordingly, the user does not recognize that the mail address has been switched, unless the email configuration screen 280 illustrated in FIG. 10B is displayed. Further, the display control 24 controls the display 220 to display a drawing start screen 190 that includes a ticker indicating that the user can start drawing, such as "Welcome, Mr. Kato", as illustrated in FIG. 14C (S21). This text "Kato" is generated using the user name that is received at S15. This enables the user A and the user B to start drawing on the electronic whiteboard 2x.

Figure 16:
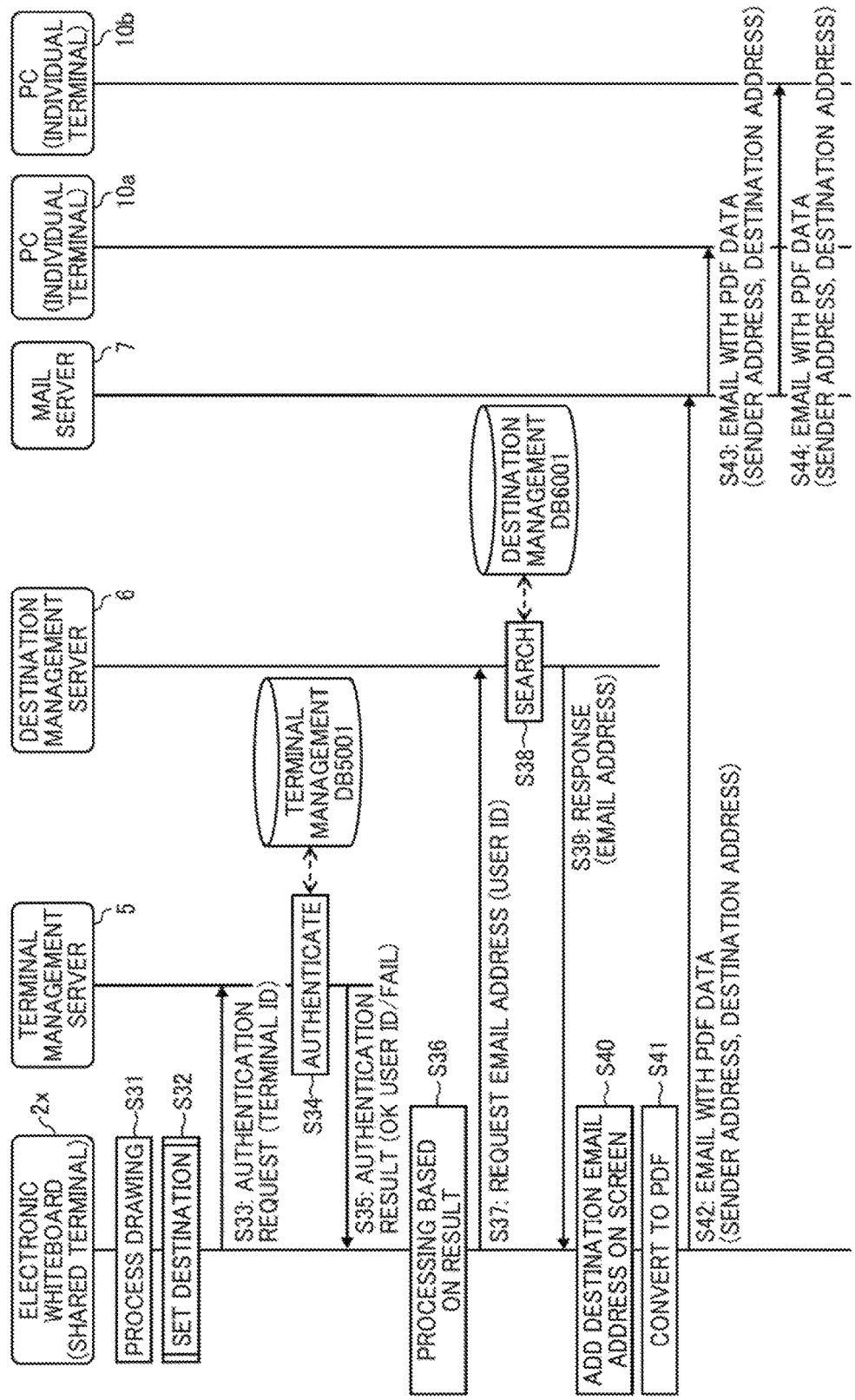
FIG. 16 is a sequence diagram illustrating operation of processing data communication, according to a first embodiment.
Figure 17:
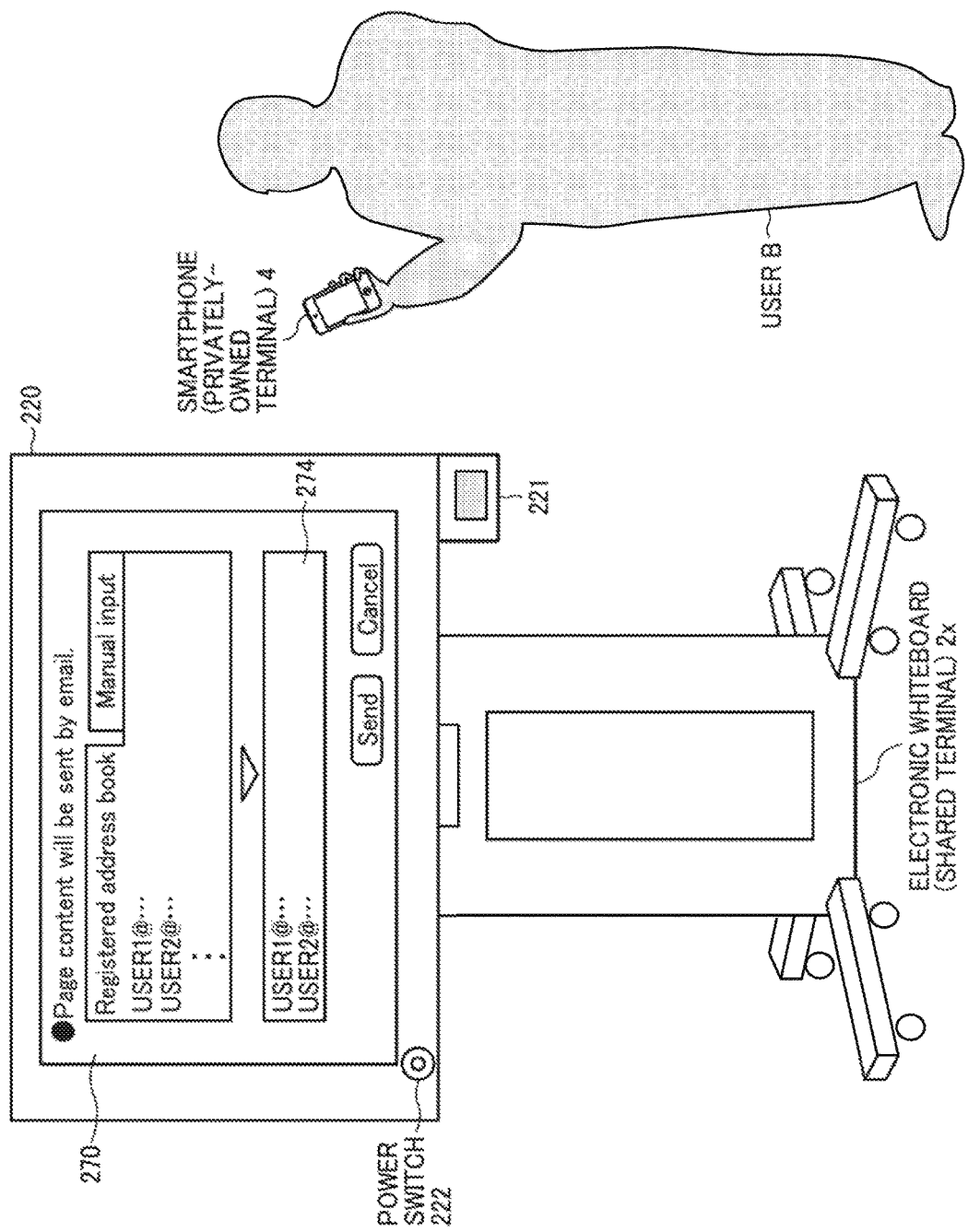
FIG. 17 is an illustration for explaining a use scenario of the electronic whiteboard, according to an embodiment.
Figure 18:
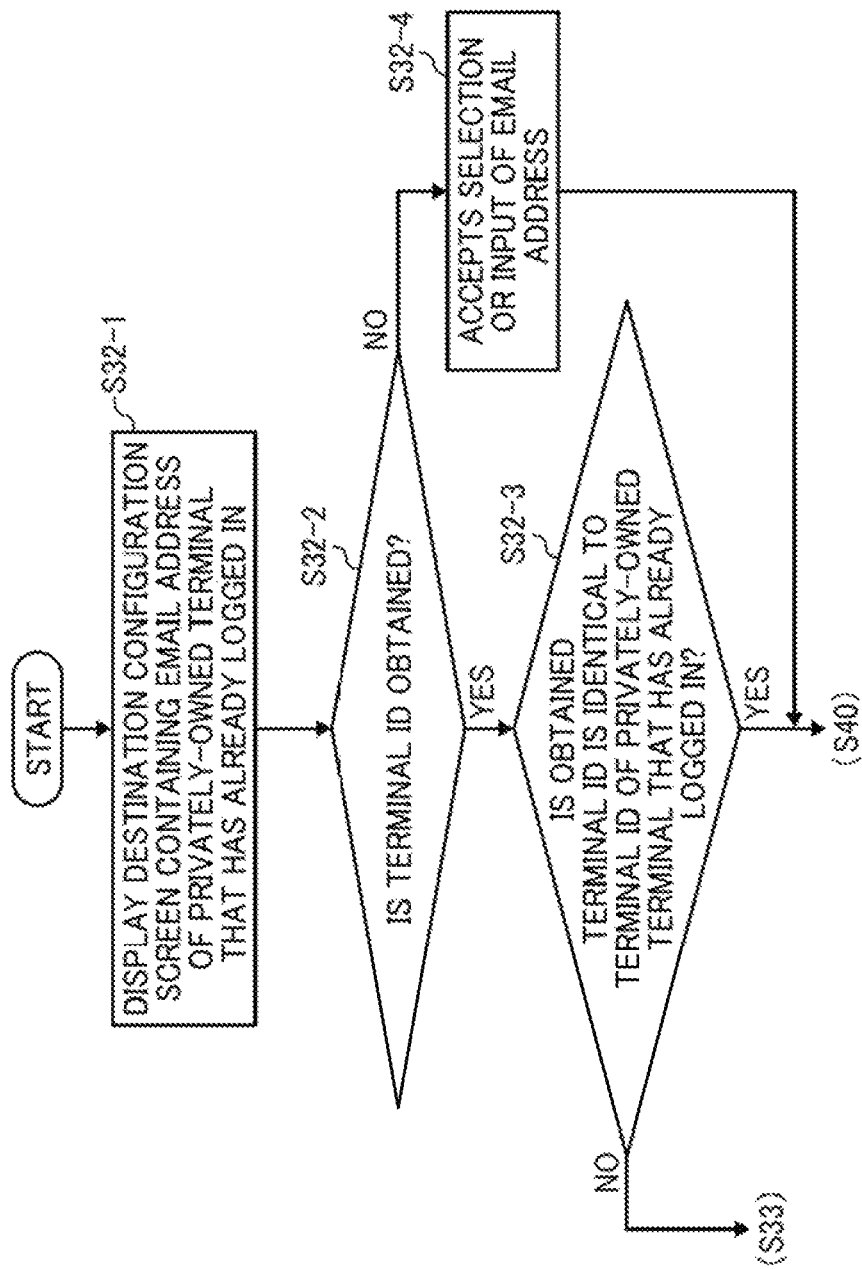
FIG. 18 is a flowchart illustrating operation of preparing for transmission of an email, according to an embodiment.

Referring to FIGS. 16 to 18, a description is given of operation of transmitting an email attached with data regarding an image such as a drawing image from the electronic whiteboard 2x to the PC 10a owned by the user A and the PC 10b owned by the user B. FIG. 16 is a sequence diagram illustrating operation of communicating data regarding an image according to the first embodiment. FIG. 17 is an illustration for explaining a use scenario of the electronic whiteboard 2, according to the first embodiment.

Referring to FIG. 16, the users A and B conduct the meeting, using a drawing image drawn on the electronic whiteboard 2x with the electronic pen 2500. The electronic whiteboard 2x processes the drawing image drawn by the user A or B to generate drawing image data (S31). As described above, the drawing image data may be transmitted via email. There are mainly two methods of transmitting drawing image data as an attachment to an email, from the electronic whiteboard 2x to at least one of the PC10a and PC 10b.

According to the first transmission method, the user A, who has logged in the electronic whiteboard 2x, presses the "Menu" button 231 illustrated in FIG. 8A, to cause the display 220 to display the menu selection window 232. The user A further presses the "Email" button 237 illustrated in FIG. 8B to cause the display 220 to display the destination configuration screen 270 illustrated in FIG. 10A, and thereby sets the email address of the user A. On the destination configuration screen 270 that is displayed as above according to the first transmission method, as illustrated in FIG. 10A, the email address of the user A, who has already logged in the electronic whiteboard 2x, is displayed at first in the address configuration field 274. Alternatively, the user A may select the "Manual input" tab 272 to manually enter the email address of the user A with such as the electronic pen 2500.

According to the second transmission method, as illustrated in FIG. 17, the user B, who has not logged in the electronic whiteboard 2x, brings his or her smartphone 4 in proximity of the near-distance communication device 221 of the electronic whiteboard 2 to transmit an email to the PC 10b owned by the user B. Hereinafter, a description is given mainly of the second transmission method.

As illustrated in FIG. 17, for example, when the user B, after drawing an image, brings his or her smartphone 4 in proximity of the near-distance communication device 221 of the electronic whiteboard 2x, the electronic whiteboard 2x performs setting processing of a destination to which an email attached with drawing image data is to be transmitted (S32). In this case, the obtainer and provider 28 of the electronic whiteboard 2x obtains the terminal ID for identifying the smartphone 4 (as an example of the privately-owned terminal), from the obtainer and provider 48 of the smartphone 4. Referring to FIG. 18, preparation processing of email transmission is described. FIG. 18 is a flowchart illustrating operation preparing for transmission of an email, according to the embodiment.

First, when the user A brings his or her IC card 3 in proximity of the near-distance communication device 221 of the electronic whiteboard 2, the display control 24 causes the display 220 to display the destination configuration screen 270, as illustrated in FIG. 17 (S32-1). As described above, the email address of the user A, who has logged in the electronic whiteboard 2x, is displayed in the address configuration field 274 of the destination configuration screen 270. This email address of the user A is an email address that is transmitted from the destination management server 6 at S19.

Next, the determiner 25 of the electronic whiteboard 2x determines whether the terminal ID is obtained at the obtainer and provider 28 (S32-2). When the determiner 25 determines that the terminal ID is obtained at the obtainer and provider 28 ("YES" at S32-2), the determiner 25 further determines whether the obtained terminal ID is an ID identifying the privately-owned terminal that has logged in the electronic whiteboard 2x (S32-3). When the determiner 25 determines that the obtained terminal ID is a terminal ID of the privately-owned terminal that has logged in (S32-3: YES), the operation proceeds to S40 illustrated in FIG. 16. A description is given later of the step S40. By contrast, when the determiner 25 determines that the obtained terminal ID is not a terminal ID of the privately-owned terminal that has logged in (S32-3: NO), the operation proceeds to S33 illustrated in FIG. 16. A description is given later of the step S33.

Further, when the determiner 25 determines that the terminal ID is not obtained at the obtainer and provider 28 (S32-2: NO), the acceptance unit 22 of the electronic whiteboard 2x accepts selection of an email address from the email addresses being displayed on the registered address book field 273 illustrated in FIG. 10A, or input of the email address after selection of the "Manual input" tab 272 (S32-4). The operation then proceeds to S40 of FIG. 16.

Assuming that the determiner 25 determines that the terminal ID is not the terminal ID of the privately-owned terminal that has logged in ("NO" at S32-3), processing after S33 is described referring to FIG. 16.

The transmitter and receiver 21 of the electronic whiteboard 2x transmits an authentication request for authenticating the smartphone 4 to the terminal management server 5 (S33). The authentication request includes the terminal ID of the smartphone 4, obtained at the obtainer and provider 28. The terminal management server 5 receives the authentication request at the transmitter and receiver 51.

The authenticator 52 of the terminal management server 5 authenticates the smartphone 4 using the terminal ID that is obtained (S34). More specifically, the storing and reading processor 59 searches the terminal management table (FIG. 12A) in the terminal management DB 5001 using the terminal ID received at S33 as a search key, to obtain the user ID associated with the terminal ID. When the user ID associated with the terminal ID is found, the authenticator 52 confirms the terminal ID of the smartphone 4 to determine that the smartphone 4 (terminal ID) is a legitimate smartphone owned by the authorized user identified with the user ID that is found. When the user ID associated with the terminal ID is not found, the authenticator 52 determines that the smartphone 4 (terminal ID) is not a legitimate smartphone owned by the authorized user.

Next, the transmitter and receiver 51 of the terminal management server 5 transmits an authentication result to the electronic whiteboard 2x (S35). When the authenticator 52 determines that the smartphone 4 is a legitimate smartphone, the authentication result includes information indicating that the smartphone 4 is a legitimate smartphone and the user ID identifying the user who owns the smartphone. When the authenticator 52 determines that the smartphone 4 is not a legitimate smartphone, the authentication result includes information indicating that the smartphone 4 is not a legitimate smartphone. The transmitter and receiver 21 of the electronic whiteboard 2x receives the authentication result.

Next, the electronic whiteboard 2x performs processing based on the authentication result (S36). In one example, when the authentication result includes information indicating that the smartphone 4 is not a legitimate smartphone, the display control 24 controls the display 220 to display a message indicating that email transmission is not allowed. When the authentication result includes information indicating that the smartphone 4 is a legitimate smartphone, the electronic whiteboard 2x continues to process email transmission of drawing image data. The following describes the case where the authentication result includes the information indicating that the smartphone 4 is a legitimate smartphone.

The transmitter and receiver 21 of the electronic whiteboard 2x transmits a request for email address to the destination management server 6 (S37). This email address request includes the user ID that is received at S35. In this case, the user ID of the user B is included in the email address request. The destination management server 6 receives the email address request at the transmitter and receiver 61.

Next, the storing and reading processor 69 of the destination management server 6 searches the destination management table (FIG. 12B) in the destination management DB 6001, using the user ID received at S37 as a search key, to obtain the email address associated with the user ID (S38). The transmitter and receiver 61 transmits a response to the email address request to the electronic whiteboard 2x (S39). The response includes an email address that is obtained at S38. The electronic whiteboard 2x receives the response to the email address request at the transmitter and receiver 21.

The display control 24 of the electronic whiteboard 2x additionally displays, with the email address (USER1@ . . . ) of the user A that has been already displayed in the address configuration field 274, an email address (USER2@ . . . ) of the user B, as illustrated in FIG. 14D (S40).

Subsequently, when the acceptance unit 22 of the electronic whiteboard 2x accepts pressing of the "Send" button 277 by the user, the second generator 26b of the electronic whiteboard 2x generates image data in PDF, from the drawing image data in bitmap that has been generated based on drawing by the user (S41). The transmitter and receiver 21 transmits an email attached with the image data generated at S41, to the mail server 7 (S42). The email includes a sender email address of the user A, and a destination email address that is, an address of the PC 10a or the PC 10b that is received at S39. The transmitter and receiver 71 of the mail server 7 receives the email attached with the image data in PDF. In other words, because the sender email address has been changed from the email address of the electronic whiteboard 2x to the email address of the user A at S20, the user A sends an email to his or her own address. Further, the user B receives an email that is addressed to the user B him- or herself from the user A.

The transmitter and receiver 71 of the mail server 7 transmits the email, attached with the image data in PDF, to each one of the PC 10a and the PC 10b (S43, S44). The email includes a sender email address of the user A, and a destination email address that is, an address of each of the PC 10a or the PC 10b that is received at S39. Each of the PC 10a and PC 10b receives the email attached with the image data in PDF, which is generated based on the drawing image drawn on the electronic whiteboard 2x.

If the sender email address of an email attached with data such as the drawing image data is set to an email address of the electronic whiteboard 2x, the user A or the user B who receives the email from the electronic whiteboard 2x has a difficulty recognizing in which meeting the received drawing image data was generated, or with whom such meeting was held. The user A operating the electronic whiteboard 2x may change the sender address of the email from the email address of the electronic whiteboard 2x to an email address of the user A as a participant in the meeting or the like. However, the user A may find it cumbersome to change the email address, as the user A has to perform the change manually using an electronic pen 2500 or the like. To address such issue, according to the embodiment, the user A brings his or her IC card 3 in proximity of the near-distance communication device 221 to log in the electronic whiteboard 2x (S12), and thereby the electronic whiteboard 2x obtains the email address of the user A from the destination management server 6 (S19). Thus, an email address of the user A, who participated in the meeting, is set as a sender address of an email transmitted from the electronic whiteboard 2x. This makes it easier for the user A or the user B who receives the email to recognize in which meeting or the like the received data such as drawing image data was generated, or with whom such meeting was held, while reducing workload for the user A.

Operation of Second Embodiment

Figure 19:
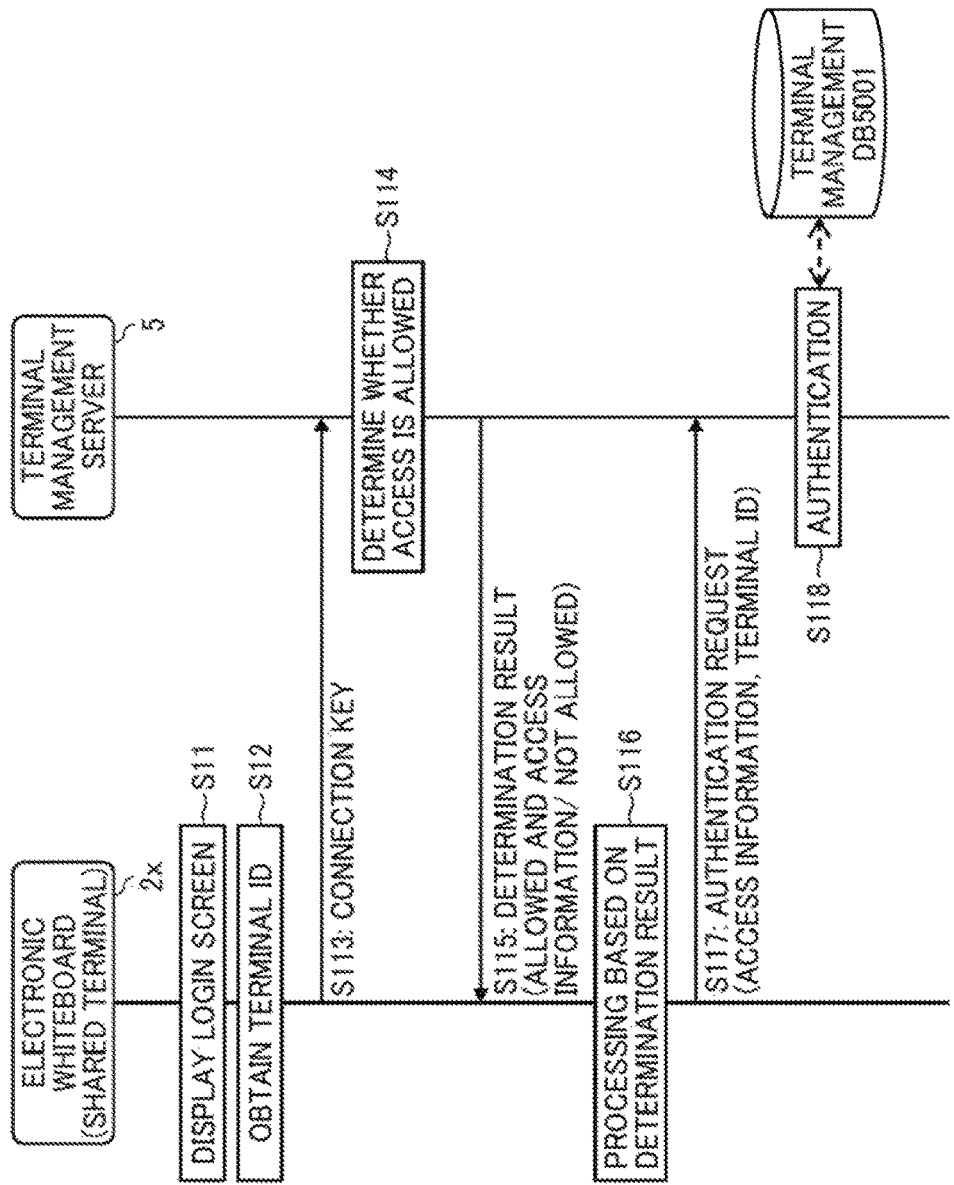
FIG. 19 is a sequence diagram illustrating operation of processing data communication, according to a second embodiment.

Referring to FIG. 19, operation of a second embodiment is described. FIG. 19 is a sequence diagram illustrating operation of communicating data regarding an image according to the second embodiment. In this embodiment, steps S13 and S14 of FIG. 13 according to the first embodiment are replaced by steps S113 to S117 of FIG. 19, such that the following describes operation of S113 to S117. In one example, there may be a plurality of the terminal management servers 5.

When the obtainer and provider 28 of the electronic whiteboard 2x obtains the terminal ID of the IC card 3 from the obtainer and provider 38 of the IC card 3 at S12 of FIG. 13, referring to FIG. 19, the transmitter and receiver 21 of the electronic whiteboard 2x transmits a connection key k1 to the terminal management server 5 (S113). The terminal management server 5 receives the connection key k1 at the transmitter and receiver 51. The connection key k1 is issued as a client of the terminal management server 5 that possesses information for authentication, and stored in advance in the memory 2000 of the electronic whiteboard 2x.

On the other hand, a connection key k2 that is issued is stored in the memory 5000 of the terminal management server 5. The determiner 55 of the terminal management server 5 determines whether the received connection key k1 matches the stored connection key k2 to determine whether access is allowed (S114). When the determiner 55 determines that the connection key k1 matches the connection key k2, the determiner 55 determines that access is allowed. By contrast, when the determiner 55 determines that the connection key k1 does not matches the connection key k2, the determiner 55 determines that access is not allowed.

Next, the transmitter and receiver 51 of the terminal management server 5 transmits a determination result to the electronic whiteboard 2x (S115). When the determiner 55 determines that access is allowed, the determination result includes information indicating that access is allowed and information a1. When the determiner 55 determines that access is not allowed, the determination result includes information indicating that access is not allowed. The electronic whiteboard 2x receives the determination result at the transmitter and receiver 21. The access information a1 is, for example, a unique random alphanumeric string of 16 characters, 32 characters, 64 characters or the like. The access information is information generated by the determiner 55 based on the determination by determiner 55 that access is allowed. The generated access information a1 is stored temporarily in the memory 5000 by the storing and reading processor 59.

Next, the electronic whiteboard 2x performs processing based on the determination result (S116). In one example, when the determination result includes information indicating that access is not allowed, the display control 24 controls the display 220 to display a message indicating that access is not allowed. By contrast, when the authentication result includes information indicating that access is allowed, the operation proceeds to S117. The following describes the case where the determination result includes the information indicating that access is allowed.

The transmitter and receiver 21 of the electronic whiteboard 2x transmits an authentication request to the terminal management server 5 (S117). The authentication request includes the terminal ID obtained at S12 and access information a2. The terminal management server 5 receives the authentication request at the transmitter and receiver 51.

The authenticator 52 of the terminal management server 5 authenticates the IC card 3 using the access information a2 and the terminal ID (S118). More specifically, the determiner 55 determines whether the received access information a2 matches the access information a1 that is temporarily stored in the memory 5000. When the determiner 55 determines that the access information a2 matches the access information a1, the authenticator 52 performs authentication in substantially the same manner as S14 described referring to FIG. 13. By contrast, when the determiner 55 determines that the received access information a2 does not match the access information a1 that is temporarily stored in the memory 5000, the authenticator 52 does not perform authentication. In this case, the transmitter and receiver 51 transmits, to the electronic whiteboard 2x, information indicating that the IC card 3 is not a legitimate IC card. Since operation after S118 is performed in substantially the same manner as described above referring to S14 and subsequent steps, description thereof is omitted.

In one example, the transmitter and receiver 51 may encrypts the access information a1 after S114, and transmits the encrypted access information a1 at S115.

As described above, in the second embodiment, the terminal management server 5 is able to determine whether the electronic whiteboard 2x (shared terminal) is a licensed and legitimate terminal, in addition to authentication using the terminal ID. Thus, the second embodiment further enables to provide a communication system whose security is improved.

Further, according to the second embodiment, in a case in which there are a plurality of terminal management servers 5, when the electronic whiteboard 2x sends an authentication request to a terminal management server that does not generate the access information at S114, the electronic whiteboard 2x receives a response indicating that access is not allowed. Accordingly, the second embodiment enables to improve legitimacy by authentication.

Operation of Third Embodiment

Figure 20:
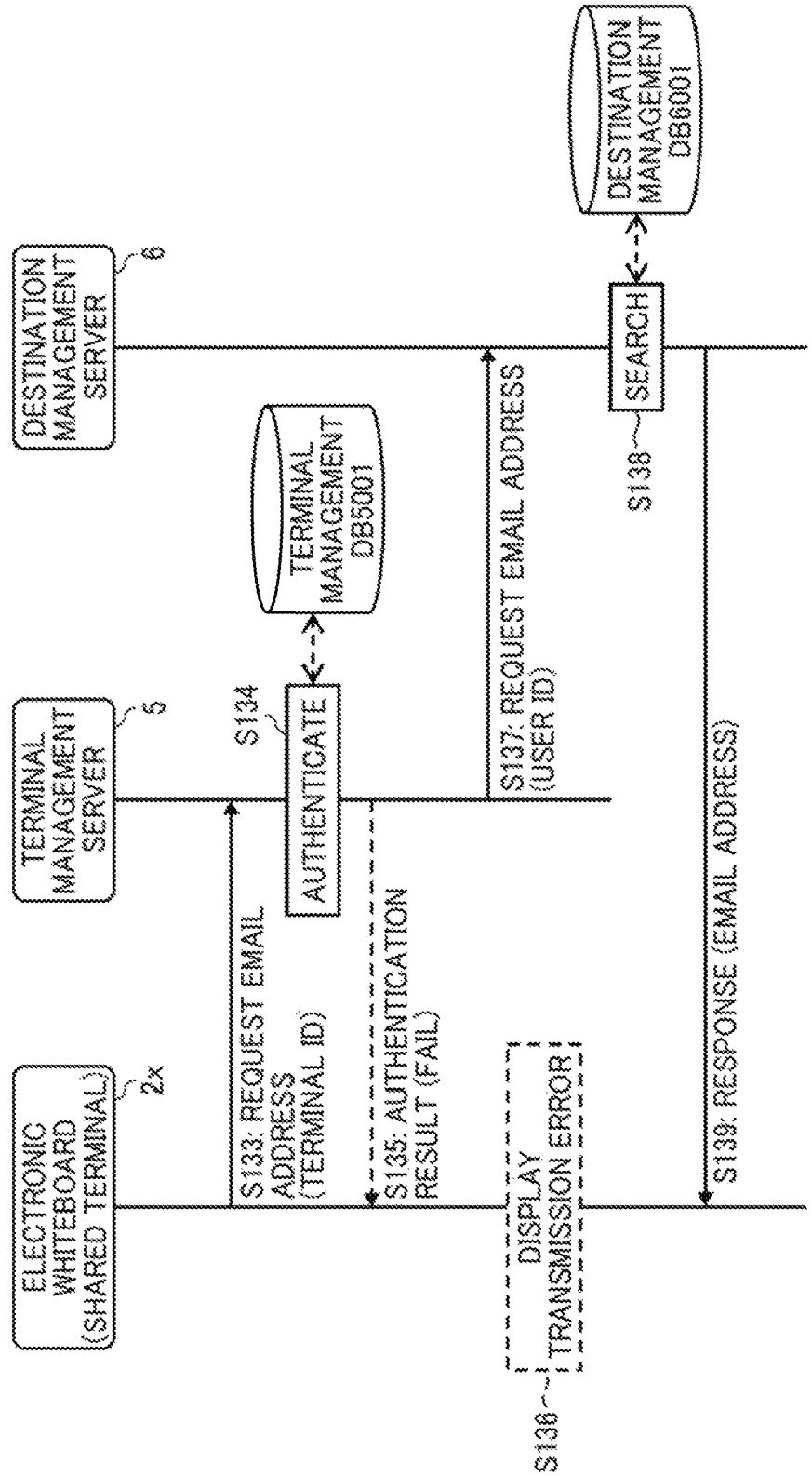
FIG. 20 is a sequence diagram illustrating operation of processing data communication, according to a third embodiment.

Referring to FIG. 20, operation of a third embodiment is described. FIG. 20 is a sequence diagram illustrating operation of communicating data regarding an image according to the third embodiment. In this embodiment, it is assumed that, the electronic whiteboard 2x, the terminal management server 5, and the destination management server 6 are newly installed in a user environment. In this embodiment, steps S33 to S39 of FIG. 16 according to the first embodiment are replaced by steps S133 to S138 of FIG. 20, such that the following describes operation of S133 to S138.

At S32-1 illustrated in FIG. 18, when the determiner 25 determines that the terminal ID is obtained ("YES" at S32-1), referring to FIG. 20, the transmitter and receiver 21 of the electronic whiteboard 2x transmits a request for email address to the terminal management server 5 (S133). The email address request includes the terminal ID of the smartphone 4, obtained at the obtainer and provider 28. The terminal management server 5 receives the email address request at the transmitter and receiver 51.

The authenticator 52 of the terminal management server 5 authenticates the smartphone 4 using the terminal (S134).

More specifically, the storing and reading processor 59 searches the terminal management table (FIG. 12A) in the terminal management DB 5001 using the terminal ID received at S133 as a search key, to obtain the user ID associated with the terminal ID. When the user ID associated with the terminal ID is found, the authenticator 52 confirms the terminal ID of the smartphone 4 to determine that the smartphone 4 (terminal ID) is a legitimate smartphone. When the user ID associated with the terminal ID is not found, the authenticator 52 determines that the smartphone 4 (terminal ID) is not a legitimate smartphone.

When the authenticator 52 determines that the smartphone 4 is not a legitimate smartphone, the transmitter and receiver 51 transmits, to the electronic whiteboard 2x, the authentication result including information indicating that the smartphone 4 is not a smartphone (S135). The electronic whiteboard 2x receives the authentication result at the transmitter and receiver 21. In this case, since the authentication result includes information indicating that the smartphone 4 is not a legitimate smartphone, the display control 24 of the electronic whiteboard 2x controls the display 220 to display a message indicating that email transmission is not allowed (S136).

By contrast, when the authenticator 52 determines that the smartphone 4 is a legitimate smartphone (terminal ID) at S134, the transmitter and receiver 51 transmits, to the destination management server 6, a request for email address (S137). The email address request includes the user ID that is found by the search at S134, which is associated with the terminal ID. The destination management server 6 receives the email address request at the transmitter and receiver 61. As described above, in this example, the electronic whiteboard 2x, terminal management server 5, and destination management server 6 are newly installed in the user environment. In such case, the functions of the terminal management server 5 can be freely changed. For this reasons, the terminal management server 5 sends a request for email address to the destination management server 6, in place of the electronic whiteboard 2x.

Next, the storing and reading processor 69 of the destination management server 6 searches the destination management table (FIG. 12B) in the destination management DB 6001, using the user ID received at S137 as a search key, to obtain the email address associated with the user ID (S138). The transmitter and receiver 61 transmits a response to the email address request to the electronic whiteboard 2x (S139). The response includes an email address obtained at S138. The electronic whiteboard 2x receives the response to the email address request at the transmitter and receiver 21. Accordingly, the electronic whiteboard 2x obtains the email address of the user A, who brings the smartphone 4 in proximity of the near-distance communication device 221.

As described above, in the third embodiment, the terminal management server 5 sends a request for email address to the destination management server 6 in place of the electronic whiteboard 2x (S137). This further reduces processing to be performed at the electronic whiteboard 2x.

According to an aspect of the present disclosure, a sender address of an email attached with data such as drawing image data is an email address of a user who participated in the meeting or the like. This makes it easier for a user who receives the email to recognize in which meeting or the like the received data such as drawing image data was generated, or with whom such meeting was held, while reducing workload required in transmitting the email.

<Variationss>

Each of the elements illustrated in FIG. 2, such as the CPU 201, may be a single unit or a plurality of units. Further, each of elements of the IC card 3 illustrated in FIG. 3, the smartphone 4 illustrated in FIG. 4, the computer illustrated in FIG. 5 that implements the terminal management server 5, etc., the MFP 9 illustrated in FIG. 6, and the videoconference terminal 13 illustrated in FIG. 7 may be a single unit or a plurality of units.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, in alternative to sending data of an image to be shared via email as an attachment file to the email, the electronic whiteboard 2x may send an email with a link to such image data via email. More specifically, the electronic whiteboard 2x stores the image data in any desired storage area on the network, and generates an email including a link to an address indicating the storage area where the image data is stored. The electronic whiteboard 2x further sends the email with the link, to the email address that is received from the destination management server 6. The address may be expressed by a URL, for example.

Further, the user may instruct the electronic whiteboard 2 to send any desired data regarding an image being displayed on the display 220 of the electronic whiteboard 2. Examples of such data regarding the image include, but not limited to, drawing image data that reflects drawings made by the user as described above, and non-drawing image data such as data of a presentation material as described above. For example, the data of the presentation material having additional drawing made by the user, or a link to such data, may be transmitted via email to allow access from the user.

In another example, the electronic whiteboard 2 may send image data of an electronic watermark, in addition to stroke data corresponding to the stroke data that reflects drawings made by the user. The electronic watermark data is any image, which is superimposed on a layer of the stroke data (that is, the drawing image data) for display to the user. The electronic watermark data may be stored in any desired memory, such as a memory of the electronic whiteboard 2. To make the stroke data visible to the user, the watermark data is displayed, for example, in partly transparent. For example, the image with the word "confidential" may be superimposed on the drawing image data, to warn the user that the drawing image data is confidential. When sending the drawing image data, which is displayed with the watermark data, the electronic whiteboard 2 may generate a PDF file of the drawing image data and the watermark data, and send an email addressed to the email address of the user, attached with a file of the generated PDF file. Alternatively, the electronic whiteboard 2 may send an email with a link to the file of the generated PDF file. With the watermark being displayed with the drawing image data (or any other image data), the user is able to know that such image data is confidential information.

In another example, the electronic whiteboard 2 may display the image data, such as the drawing image data, without the electronic watermark data. When sending the drawing image data, the electronic whiteboard 2 may generate a PDF file of the drawing image data and the watermark data, and send an email attached with a file of the generated PDF file or an email with a link to the generated PDF file. This improves visibility to the user during video-conferencing or any conferencing, while increasing a level of security when sending image data via email.

As described above, examples of the data regarding the image include data of an image being displayed at the electronic whiteboard such as the drawing image data, the drawing image data with the watermark data, any presentation material, etc. Other examples of the data regarding the image include data relating to the displayed image such as the watermark data.

Examples of drawings made by the user include, but not limited to, characters, marks, figures, etc., which may be drawn by the user either manually or using any graphics processing tool.

Further, the drawing image data may be captured at a time when a user instruction for sending the drawing image data is received. Alternatively, the drawing image data may be obtained from a local memory of the electronic whiteboard 2. For instance, the user may instruct the electronic whiteboard 2 to send drawing image data, which has been previously stored in a memory or read out from a removable recording medium. In such case, the user may firstly cause the electronic whiteboard 2 to display such image on the display 220 to be shared by a plurality of uses.

Further, the above-described example case assumes that only two users (user A and user B) instruct to send drawing image data via email. Alternatively, any number of users may instruct the electronic whiteboard 2 to send drawing image data via email. With detection of the terminal identification information, the electronic whiteboard 2 repeats operation of obtaining an email address.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array), SOC (system on chip), GPU, and conventional circuit components arranged to perform the recited functions.

Any one of the above-described operations may be performed in various other ways, for example, in an order different from the one described above.

What is claimed is:

1. A shared terminal, comprising:
   circuitry to control a display to display an image to a plurality of users, the plurality of users sharing a use of the shared terminal; and
   a network interface to communicate with a terminal management server and a destination management server through a network,
      the terminal management server storing in a first memory, for each one of the plurality of users, user identification information for identifying the user in association with terminal identification information for identifying a privately-owned terminal that is privately owned by the user, and
      the destination management server storing in a second memory, for each one of the plurality of users, the user identification information of the user in association with an email address of the user,
   wherein the circuitry obtains, from a first privately-owned terminal owned by a first user of the plurality of users, first terminal identification information for identifying the first privately-owned terminal, and
   wherein under control of the circuitry, the network interface:
      transmits the first terminal identification information of the first privately-owned terminal to the terminal management server;
      receives first user identification information for identifying the first user from the terminal management server, the first user identification information being obtained by the terminal management server from the first memory using the first terminal identification information received from the shared terminal;
      transmits the first user identification information that is received to the destination management server;
      receives a first email address of the first user from the destination management server, the first email address being obtained by the destination management server from the second memory using the first user identification information received from the shared terminal; and
      transmits, to a given destination, an email whose sender email address is the first email address that is received from the destination management server, to allow a user receiving the email to obtain data relating to the image being displayed to the plurality of users through the shared terminal.

2. The shared terminal of claim 1,
   wherein under control of the circuitry, the network interface transmits the first terminal identification information that is obtained to the terminal management server during login process to the shared terminal by the first user.

3. The shared terminal of claim 1,
   wherein, before transmission of the email, the circuitry controls the display to display a destination setting screen displaying the first email address as the destination to which the email whose sender email address is the first email address is to be transmitted.

4. The shared terminal of claim 3,
   wherein, in a case in which the circuitry obtains, from a second privately-owned terminal owned by a second user of the plurality of users, second terminal identification information for identifying the second privately-owned terminal during display of the destination setting screen by the circuitry, under control of the circuitry, the network interface:
   transmits, to the terminal management server, the second terminal identification information that is obtained;
   receives, from the terminal management server, second user identification information for identifying the second user, the second user identification information being obtained by the terminal management server from the first memory using the second terminal identification information received from the shared terminal;
   transmits the second user identification information that is received to the destination management server; and
   receives, from the destination management server, a second email address of the second user, the second email address being obtained by the destination management server from the second memory using the second user identification information received from the shared terminal, and
   the circuitry additionally displays the second email address on the destination setting screen with the first email address, as the destination to which the email whose sender email address is the first email address is to be transmitted.

5. The shared terminal of claim 1, wherein the circuitry converts data of a drawing image in bitmap, to image data in portable document format (PDF), and under control of the circuitry, the network interface transmits the email attached with the image data in PDF.

6. A method of controlling transmission of an image, performed by a shared terminal, the method comprising:

displaying, on a display, an image to a plurality of users, the plurality of users sharing a use of the shared terminal;

storing, in a first memory of a terminal management server, for each one of the plurality of users, user identification information for identifying the user in association with terminal identification information for identifying a privately-owned terminal privately owned by the user;

storing, in a second memory of a destination management server, for each one of the plurality of users, the user identification information of the user in association with an email address of the user;

obtaining, from a first privately-owned terminal owned by a first user of the plurality of users, first terminal identification information for identifying the first privately-owned terminal;

transmitting the first terminal identification information of the first privately-owned terminal to the terminal management server;

receiving, from the terminal management server, first user identification information for identifying the first user from the terminal management server, the first user identification information being obtained by the terminal management server from the first memory using the first terminal identification information received from the shared terminal;

transmitting the first user identification information that is received to the destination management server;

receiving a first email address of the first user from the destination management server, the first email address being obtained by the destination management server from the second memory using the first user identification information received from the shared terminal; and transmitting, to a given destination, an email whose sender email address is the first email address that is received from the destination management server, to allow a user receiving the email to obtain data relating to the image being displayed to the plurality of users through the shared terminal.

* * * * *